(12) United States Patent
Kitamori et al.

(10) Patent No.: US 10,038,863 B2
(45) Date of Patent: Jul. 31, 2018

(54) IMAGE SENSING DEVICE

(71) Applicant: Renesas Electronics Corporation, Tokyo (JP)

(72) Inventors: Tatsuya Kitamori, Tokyo (JP); Fumiyasu Sasaki, Tokyo (JP); Fumihide Murao, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/597,312

(22) Filed: May 17, 2017

(65) Prior Publication Data

US 2018/0054578 A1 Feb. 22, 2018

(30) Foreign Application Priority Data

Aug. 17, 2016 (JP) ................................. 2016-159804
Nov. 29, 2016 (JP) ................................. 2016-231426

(51) Int. Cl.
| | |
|---|---|
| *H04N 5/361* | (2011.01) |
| *H04N 5/378* | (2011.01) |
| *H04N 5/376* | (2011.01) |
| *H04N 5/347* | (2011.01) |
| *H04N 5/232* | (2006.01) |

(52) U.S. Cl.
CPC ......... *H04N 5/361* (2013.01); *H04N 5/23245* (2013.01); *H04N 5/347* (2013.01); *H04N 5/378* (2013.01); *H04N 5/3765* (2013.01)

(58) Field of Classification Search
CPC .... H04N 5/361; H04N 5/378; H04N 5/23245; H04N 5/347; H04N 5/3765
USPC ........................................................... 348/294
See application file for complete search history.

(56) References Cited

U.S. PATENT DOCUMENTS

| | | | | |
|---|---|---|---|---|
| 7,460,164 | B2 * | 12/2008 | Hyama | H04N 5/361 |
| | | | | 250/208.1 |
| 7,893,978 | B2 * | 2/2011 | Hiyama | H04N 5/378 |
| | | | | 250/208.1 |
| 8,411,188 | B2 * | 4/2013 | Iida | H03G 5/28 |
| | | | | 250/208.1 |
| 9,544,521 | B2 * | 1/2017 | Murakami | H04N 5/378 |
| 9,571,758 | B2 * | 2/2017 | Hashimoto | H04N 5/35545 |
| 2005/0168603 | A1 * | 8/2005 | Hiyama | H04N 5/361 |
| | | | | 348/294 |

(Continued)

FOREIGN PATENT DOCUMENTS

JP 2013-175936 A 9/2013

*Primary Examiner* — Pritham Prabhakher
(74) *Attorney, Agent, or Firm* — Mattingly & Malur, PC

(57) ABSTRACT

To solve the problem of conventional image sensing devices that require much time for reading pixel signals, an image sensing device according to an embodiment includes a first pixel unit coupled to a first vertical read line, a second pixel unit coupled to a second vertical read line and placed in the column of the first pixel unit, a first transfer switch provided at an end of the first read line, and a second transfer switch provided at an end of the second read line. When the first transfer switch is controlled to be closed and the second transfer switch is controlled to be conductive, the image sensing device performs a reset process of the vertical read line by a dark level signal output from the second pixel unit, and a conversion process of the dark level read from the first pixel unit, and the pixel signal into digital values.

11 Claims, 29 Drawing Sheets

(56) References Cited

U.S. PATENT DOCUMENTS

| | | | |
|---|---|---|---|
| 2008/0218619 A1* | 9/2008 | Egawa | H04N 5/243 348/296 |
| 2010/0033601 A1* | 2/2010 | Matsuda | H04N 5/361 348/241 |
| 2011/0080507 A1* | 4/2011 | Iwasa | H04N 5/378 348/302 |
| 2011/0085065 A1* | 4/2011 | Egawa | H04N 5/357 348/294 |
| 2013/0153750 A1* | 6/2013 | Arii | H04N 5/3597 250/208.1 |
| 2013/0229543 A1* | 9/2013 | Hashimoto | H04N 5/35545 348/222.1 |
| 2016/0006966 A1* | 1/2016 | Murakami | H04N 5/378 348/308 |

* cited by examiner

FLOW OF OUTPUTTING PIXEL INFORMATION Do

FLOW OF OUTPUTTING IMAGE FEATURE INFORMATION DCI USED FOR AUTOFOCUS

FIG. 22
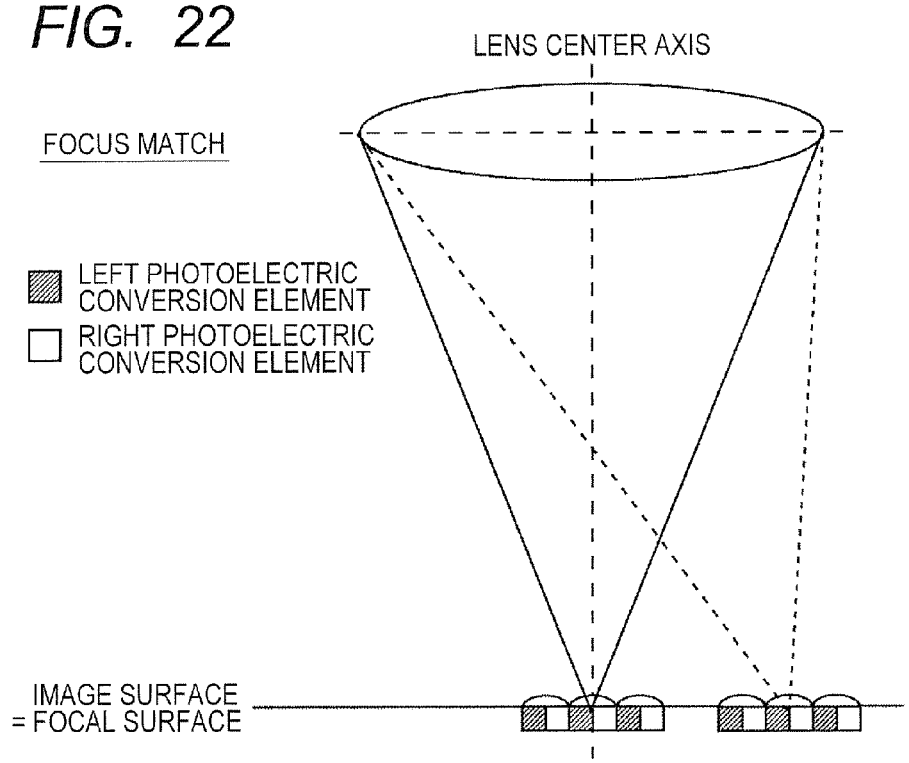
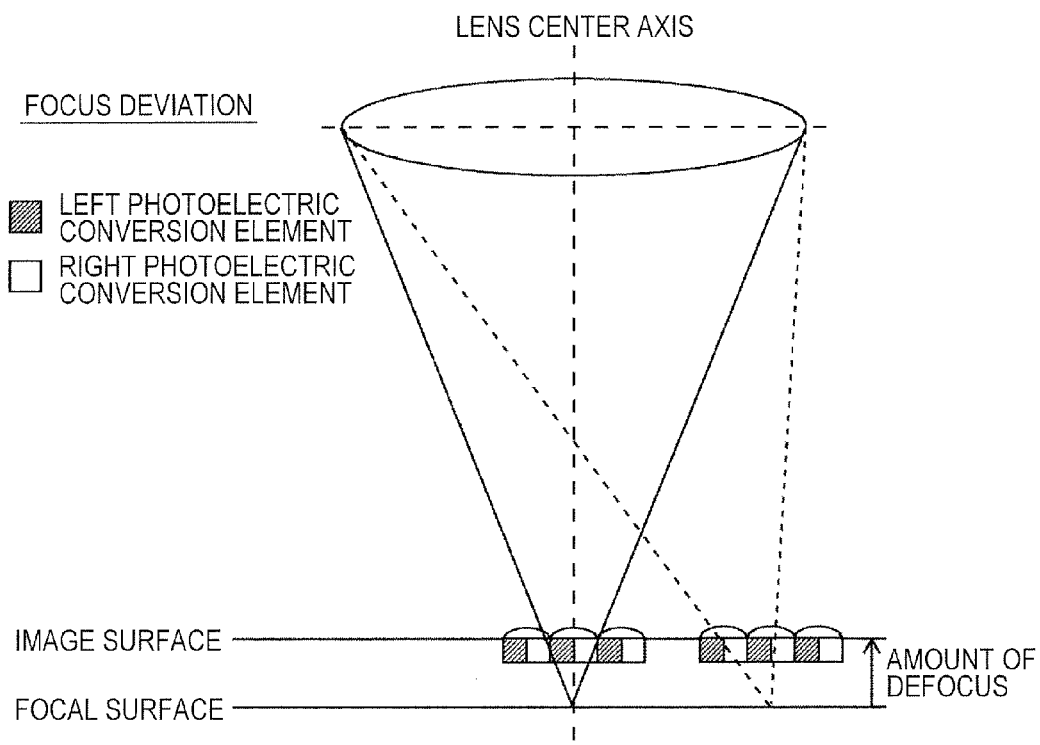

IMAGE SENSING DEVICE

CROSS-REFERENCE TO RELATED APPLICATIONS

The disclosure of Japanese Patent Application No. 2016-231426 filed on Nov. 29, 2016 and No. 2016-159804 filed on Aug. 17, 2016, including the specification, drawings and abstract is incorporated herein by reference in its entirety.

BACKGROUND

The present invention relates to an image sensing device, and more particularly, for example, to an image sensing device for converting a pixel signal obtained, from a pixel into a digital value and outputting pixel information.

Recently, there has been an expansion in the use of image sensing devices for photographing images in monitoring and measurement applications. Patent Document 1 (Japanese Unexamined Patent Application Publication No. 2013-175936) discloses an example of such an image sensing device. The image sensing device described in Patent Document 1 is an image sensing device that includes a pixel, a ramp wave generator for generating a ramp wave voltage with a ramp waveform, and an AD conversion unit for converting an input analog signal corresponding to the amount of light incident on the pixel into an output digital signal by using the ramp wave voltage, and outputting the output digital signal.

SUMMARY

In the image sensing device, the AD conversion unit performs an analog-digital conversion process on a pixel signal, which is output as an analog signal, for each pixel to generate a digital value with a value corresponding to the voltage level of the pixel signal. However, in recent years, there has been a significant increase in the number of pixels or the frame rate in the image sensing device. Such a demand for upgrading the image sensing device results in a greater restriction on the time allowed for outputting the digital value for one pixel. For this reason, recent image sensing devices have been required to output the digital value for one pixel in a shorter time.

Other objects and novel features of the present invention will become apparent from the following description and the accompanying drawings.

According to an embodiment, an image sensing device includes: a first pixel unit coupled to a first vertical read line; a second pixel unit that is coupled to a second vertical read line and is placed in the same row as the first pixel unit; a first transfer switch provided at an end of the first read line; and a second transfer switch provided at an end of the second read line. In a state in which the first transfer switch is controlled to be closed and the second transfer switch is controlled to be conductive, the image sensing device performs a reset process on the vertical read line by using a dark level signal output from either the first pixel unit or the second pixel unit, and performs a conversion process on the dark level signal output from the other pixel unit, either the first pixel unit or the second pixel unit, as well as the pixel signal into digital values.

According to the above described one embodiment, it is possible to increase the speed of the process of reading pixel information.

BRIEF DESCRIPTION OF THE DRAWINGS

FIG. 22 is a diagram showing the principle of the phase difference autofocus in the image sensing device according to the fourth embodiment;

DETAILED DESCRIPTION

First Embodiment

Figure 1:
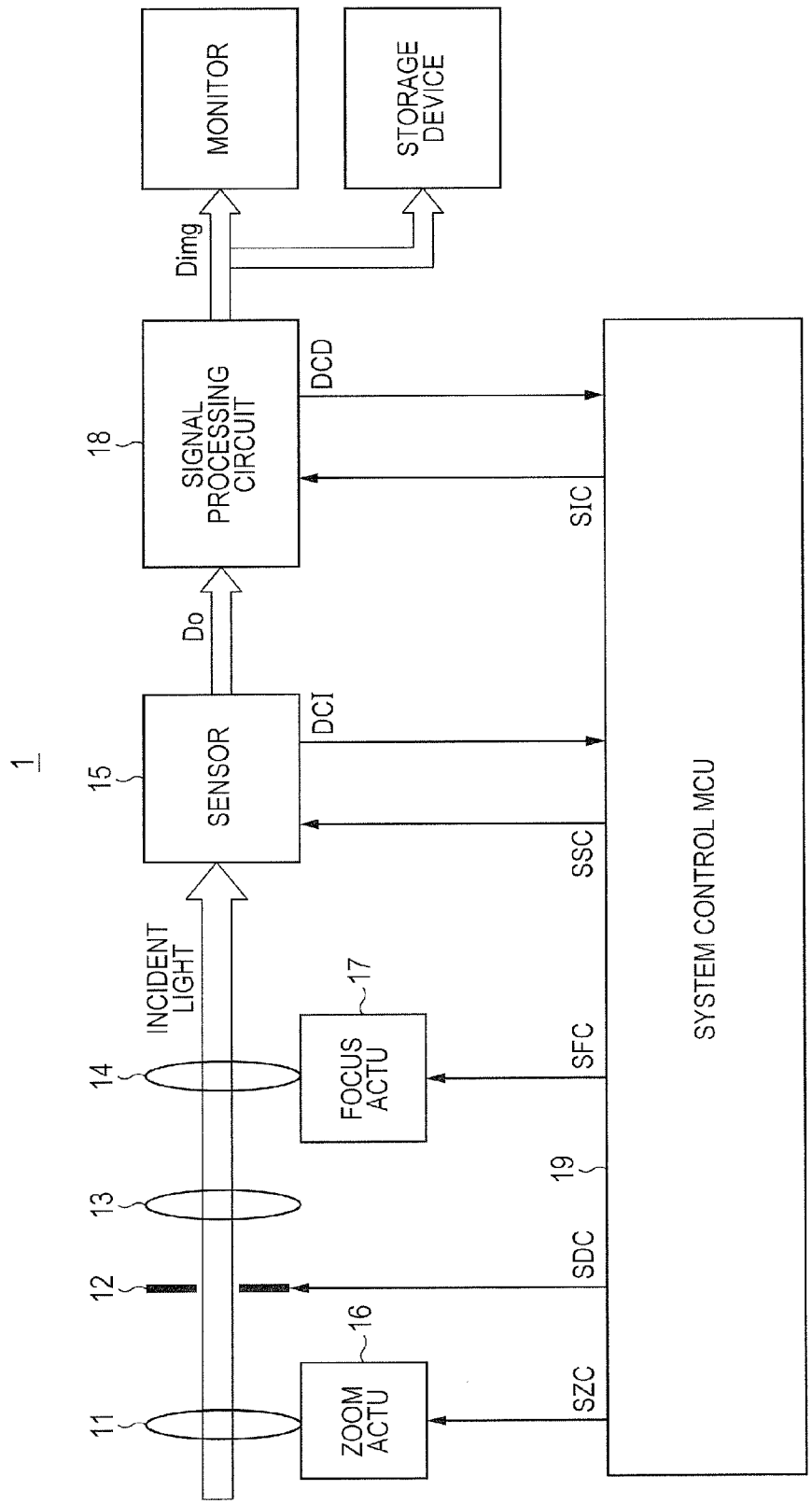
FIG. 1 is a block diagram of a camera system to which an image sensing device according to a first embodiment is applied.

In order to make the description clearer, the following descriptions and drawings are accordingly omitted or simplified. Further, each of the elements depicted in the drawings as functional blocks for performing various processes can be configured with a CPU, a memory, and other circuits from the point of view of hardware, and can be implemented by a program loaded in the memory, or the like, from the point of view of software. Thus, it is to be understood by those skilled in the art that these functional blocks can be implemented in various ways, such as only hardware, only software, or a combination of the two. The present invention is not restricted to any configuration. Note that the same elements are designed by like reference numerals in each of the figures, and redundant description will be omitted as appropriate.

Further, the program can be stored by using different types of non-transitory computer readable medium, and can be supplied to the computer. The non-transitory computer readable medium includes different types of tangible storage medium. Examples of the non-transitory computer readable medium include magnetic storage media (for example, flexible disk, magnetic tape, hard disk drive), magneto-optical medium (for example, magneto-optical disk), CD-ROM (Read Only Memory), CD-R, CDR/W, and semiconductor memories (for example, mask ROM, programmable ROM (PROM), erasable PROM (RPROM), flash ROM, random, access memory (RAM)). Further, the program can also be supplied to the computer by using different types of transitory computer readable medium. Examples of the transitory computer readable medium include electrical signal, optical signal, and electromagnetic wave. The transitory computer readable medium can supply the program to the computer via a wired communication path such as electric wire and optical fiber, or via a wireless communication path.

FIG. 1 shows a block diagram of a camera system 1 according to a first embodiment. As shown in FIG. 1, the camera system 1 includes a zoom lens 11, a diaphragm mechanism 12, a fixed lens 13, a focus lens 14, a sensor 15, a zoom lens actuator 16, a focus lens actuator 17, a signal processing circuit 18, a system control MCU 19, a monitor, and a storage device. Here, the monitor and the storage device are devices to check and store an image photographed by the camera system 1. The monitor and the storage device may be mounted on another system that is provided separately from the camera system 1.

The zoom lens 11, the diaphragm mechanism 12, the fixed lens 13, and the focus lens 14 form a lens group of the camera system 1. The zoom lens 11 is changed in position by the zoom actuator 16. The focus lens 14 is changed in position by the focus actuator 17. Then, the camera system 1 is designed to change the zoom magnification and the focus by moving the lens by means of various actuators, and change the amount of incident light by operating the diaphragm mechanism 12.

The zoom actuator 16 moves the zoom lens 11 based on a zoom control signal SZC output from the system control MCU19. The focus actuator 17 moves the focus lens 14 based on a focus control signal SFC output from the system control MCU19. The diaphragm mechanism 12 adjusts the aperture based on an aperture control signal SDC output from the system control MCU19.

The sensor 15 corresponds to the image sensing device according to the first embodiment, and includes, for example, a photoelectric conversion element such as a photodiode. The sensor 15 converts light-receiving pixel information obtained from the light receiving element into a digital value, and then outputs pixel information Do. Further, the sensor 15 can also has an additional function for analyzing the pixel information Do output from the sensor 15 and outputting pixel feature information DCI that shows the features of the pixel information Do. The image feature information DCI includes two images that are obtained in an autofocus process, which will be described in the fourth embodiment. Further, based on a sensor control signal SSC given by a module control MCU18, the sensor 15 performs gain control for each pixel of the pixel information Do, exposure control of the pixel information Do, and high dynamic range (HDR) control of the pixel information Do. Details of the sensor 15 are described below.

The signal processing circuit 18 applies image processing, such as image correction, to the pixel information Do received from the sensor 15 and outputs image data Dimg. The single processing circuit 18 analyzes the received pixel information Do and outputs color space information DCD. For example, the color space information includes the brightness information of the pixel information Do as well as the color information. Note that when the sensor 15 does not output the image feature information DCI, the signal processing circuit 18 outputs the image feature information DCI.

The system control MCU19 controls the focus of the lens group based on the image feature information DCI, which is output from the signal processing circuit 18 or from the sensor 15. More specifically, the system control MCU19 outputs the focus control signal SEC to the focus actuator 17 to control the focus of the lens group. The system control MCU19 outputs the aperture control signal. SDC to the diaphragm mechanism 12 to adjust the aperture of the diaphragm mechanism 12. Further, the system control MCU19 generates a zoom control signal SZC according to a zoom instruction given from the outside. In this way, the system control MCU19 outputs the zoom control signal SZC to the zoom actuator 16 to control the zoom magnification of the lens group.

More specifically, a focus deviation occurs when the zoom lens 11 is moved by the zoom actuator 16. Thus, the system control MCU19 calculates the phase difference in position between two object images based on two images included in the image feature information DCI obtained from the single processing circuit 18 or the sensor 15. Then, the system control MCU19 calculates the defocus amount of the lens group based on the phase difference in their positions. The system control MCU19 automatically adjusts the focus according to the defocus amount. This process is autofocus control.

Further, the system control MCU19 calculates the exposure control value that specifies the exposure setting of the sensor 15 based on the brightness information included in the color space information DCD output from the signal processing circuit 18. Then, the system control MCU19 controls the exposure setting and gain setting of the sensor 15 to allow the brightness information included in the color space information DCD output from the signal processing circuit 18 to approximate the exposure control value. At this time, the system control MCU19 can also calculate the control value of the diaphragm mechanism 12 when the exposure is changed.

Further, the system control MCU19 outputs a color space control signal SIC for adjusting the brightness or color of the image data Dimg based on an instruction from the user. Note that the system control MCU19 generates the color space control signal. SIC based on the difference between the color space information DCD obtained from the signal processing circuit. 18 and the information given from the user.

One feature of the camera system 1 according to the first embodiment resides in the circuit used for reading the pixel signal from the pixel unit of the sensor 15 and in the read control method. Further, the pixel information Do is digital data obtained by performing analog-digital conversion on a pixel signal read from the pixel unit. Thus, the sensor 15 will be described more in detail below.

Figure 2:
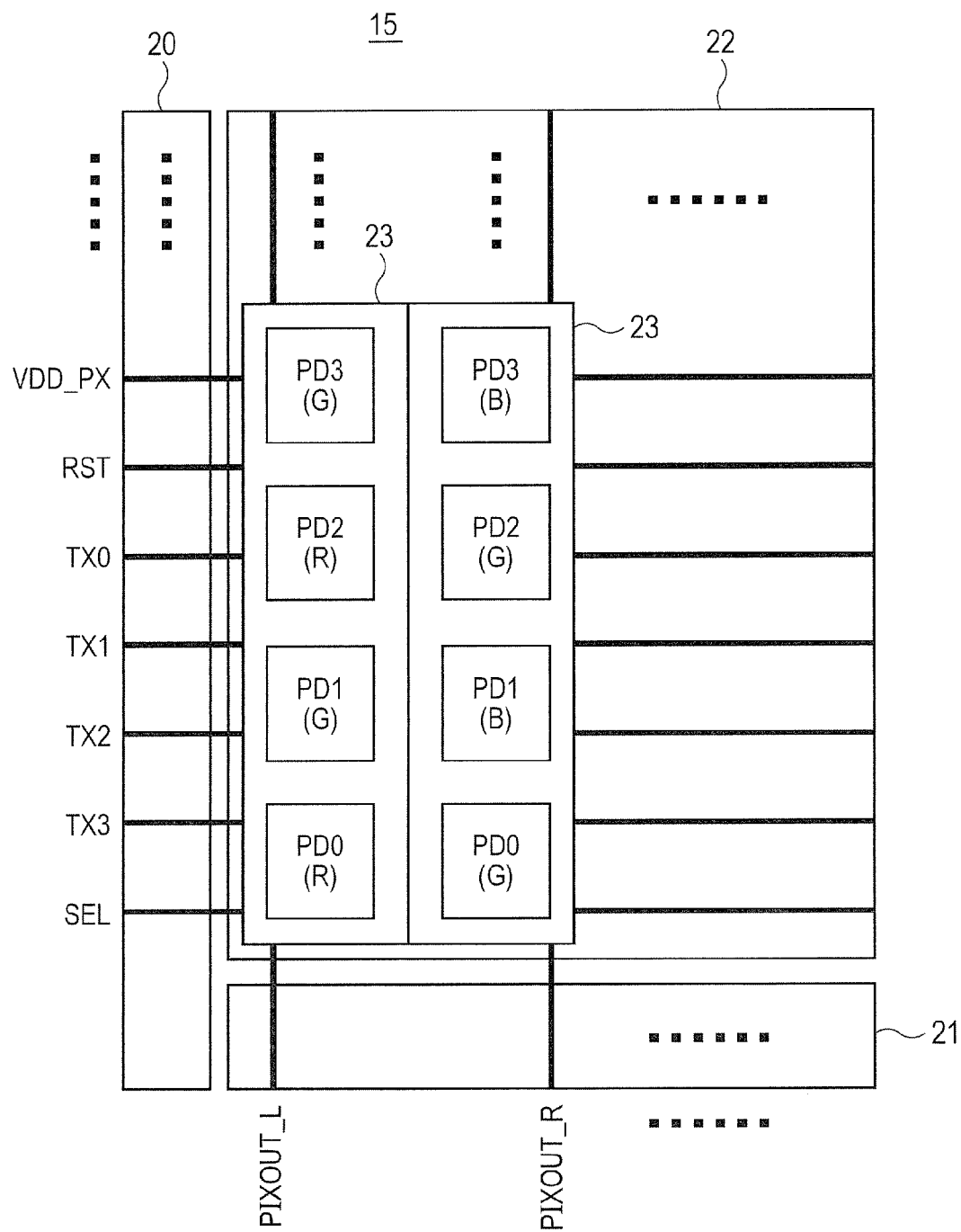
FIG. 2 is a block diagram of the image sensing device according to the first embodiment.

FIG. 2 shows a schematic diagram of a part of the floor layout of the sensor 15 according to the first embodiment. In FIG. 2, of the floor layout of the sensor 15, only the floor layout of a row controller 20, a column controller 21, and a pixel array 22 is shown.

The row controller 20 controls the active state of the pixel units 23 arranged in a lattice pattern, for each row. The column controller 21 reads pixel signals read from the pixel units 23 arranged in a lattice pattern, for each column. The column controller 21 includes a switch circuit and an output buffer to read the pixel signals. Further, the operation timing of the circuit included in the column controller 21 is controlled based on the control signal output from the low controller 20. In other words, in the sensor 15 according to the first embodiment, the row controller 20 is used as a timing control circuit of the column controller 21.

In the pixel array 22, the pixel units 23 are arranged in a lattice pattern. In the example shown in FIG. 2, each pixel unit 23 includes a photodiode group configured with one or more photoelectric conversion elements (for example, photodiodes PD) in the column direction. More specifically, each pixel unit 23 is configured with four photodiodes (for example, photodiode PD0 to PD3). Further, a color filter is provided in each photodiode. In the example shown in FIG. 2, the Bayer arrangement of color filters is adopted. In the Bayer arrangement, the color filter of green (G) that greatly contributes to the luminance signal is arranged checkerwise and the color filters of red (R) and blue (B) are arranged checkerwise in the remaining part. From the other point of view, it can be said that the color filters are arranged so as to allow different colors to transmit in adjacent pixels in the horizontal and vertical directions, respectively, of a plurality of pixels. Then, the pixel array 22 operates in terms of the pixel unit. Thus, the configuration and operation of each pixel unit is described below.

Figure 3:
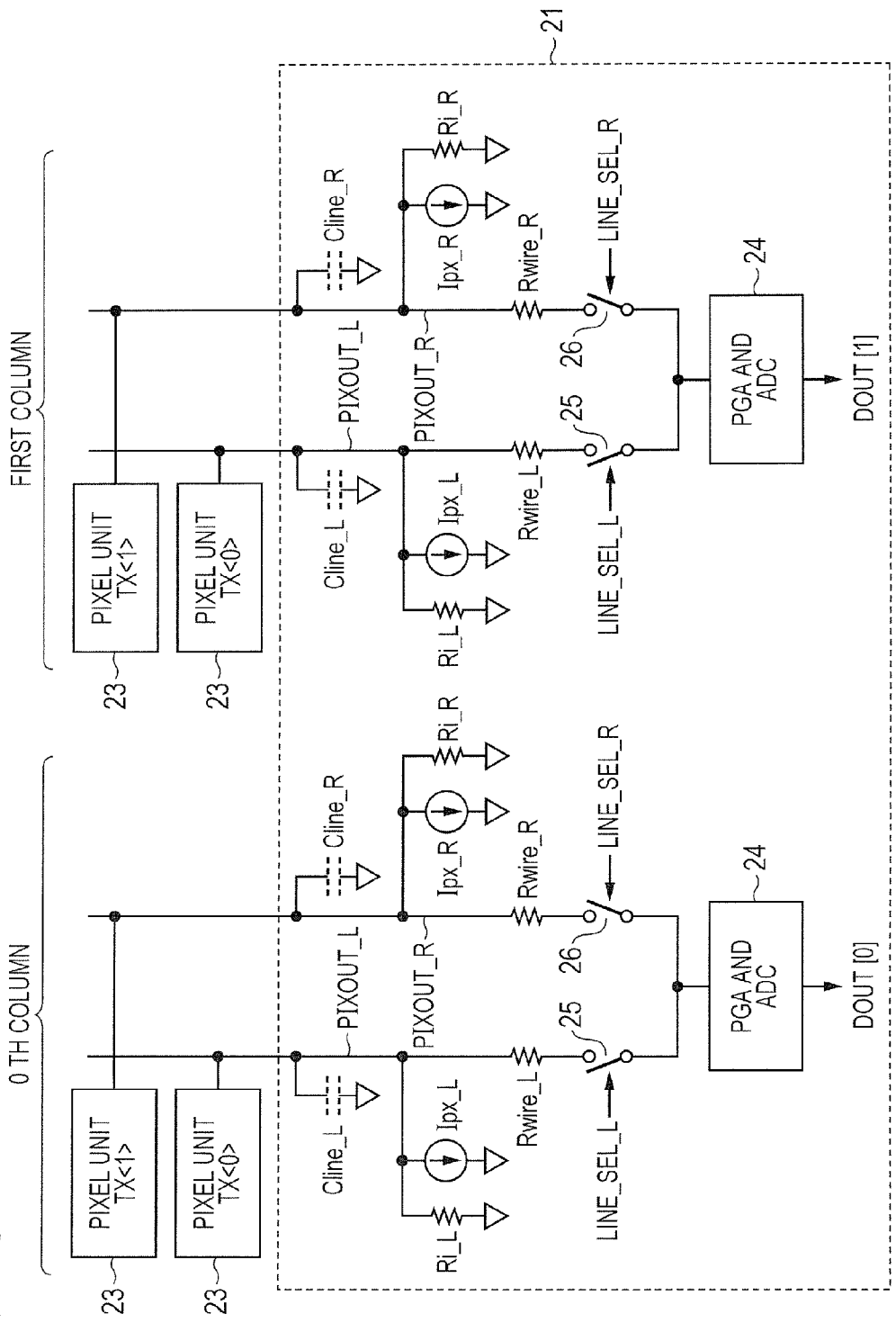
FIG. 3 is s block diagram showing a configuration of the vertical read line and transfer switch of the image sensing device according to the first embodiment.

FIG. 3 shows a block diagram showing a configuration of the vertical read line and transfer switch of the sensor 15 according to the first embodiment. Further, in order to describe more clearly the configuration of both the vertical read line and the transfer switch, FIG. 3 shows the pixel unit 23 and the analog/digital conversion circuit 24 included in the column controller 21. Further, FIG. 3 only shows pixel units of two rows and two columns as well as the circuit within the column controller 21. Further, in FIG. 3 and subsequent figures, the row number in which the pixel unit is placed is shown in < > and the column number is shown in [ ].

As shown in FIG. 3, the sensor 15 according to the first embodiment is configured such that a first vertical read line (for example, vertical read line PIXOUT_L) and a second vertical read line (for example, vertical read line PIXOUT_R) are provided in the pixel units arranged in one column. A first pixel unit (for example, a pixel unit of an even-numbered row (0th row, second row, and so on)) is coupled to the vertical read line PIXOUT_L. A second pixel unit (for example, a pixel unit of an odd-numbered row (first row, third row, and so on)) is coupled to the vertical read line PIXOUT_R.

The column controller 21 includes a first pixel current source (for example, pixel current source Ipx_L), a second pixel current source (pixel current source Ipx_R), a first transfer switch (for example, transfer switch 25), a second transfer switch (for example, transfer switch 26), and the analog/digital conversion circuit 24 for each column.

The pixel current source Ipx_L is provided corresponding to the vertical read line PIXOUT_L to draw current from the vertical read line PIXOUT_L. The pixel current source Ipx_R is provided corresponding to the vertical read line PIXOUT_R to draw current from, the vertical read line PIXOUT_R. The transfer switch 25 is provided at an end of the vertical read line PIXOUT_L. The open/closed state of the transfer switch 25 is controlled based on a read line selection signal LINE_SEL_R output from the row controller 20. The transfer switch 26 is provided at an end of the vertical read line PIXOUT_R. The open/closed state of the transfer switch 26 is controlled based on a read line selection signal LINE_SEL_L.

Note that in FIG. 3, the pixel current source is provided in the vertical read line between the pixel unit and the pixel switch. However, it may also be possible to provide the pixel current source in the path from the transfer switch to the analog/digital conversion circuit. However, when the pixel current source is provided in the path from the transfer switch to the analog/digital conversion circuit, the potential of the vertical read line may be unstable during the period in which the selection transistor within the pixel unit is closed and the transfer switch is open, resulting in more time to set the dark level to the vertical read line, which will be described below. Thus, it is desirable to provide the pixel current source in the vertical read line between the pixel unit and the pixel switch.

The analog/digital conversion circuit 24 outputs a digital value according to the signal level of the signals input through the transfer switch 25 and the transfer switch 26. In other words, one analog/digital conversion circuit 24 is provided for a pair of vertical read lines PIXOUT_L and PIXOUT_R.

Further, FIG. 3 shows a load resistance Ri (Ri_L, Ri_R in FIG. 3) coupled in parallel to the pixel current source, a parasitic resistance Rwire (Rwire_L, Rwire_L in FIG. 3) of the vertical read line, and a parasitic capacitance Cline (Cline_L, Cline_R in FIG. 3) of the virtual read line.

Figure 4:
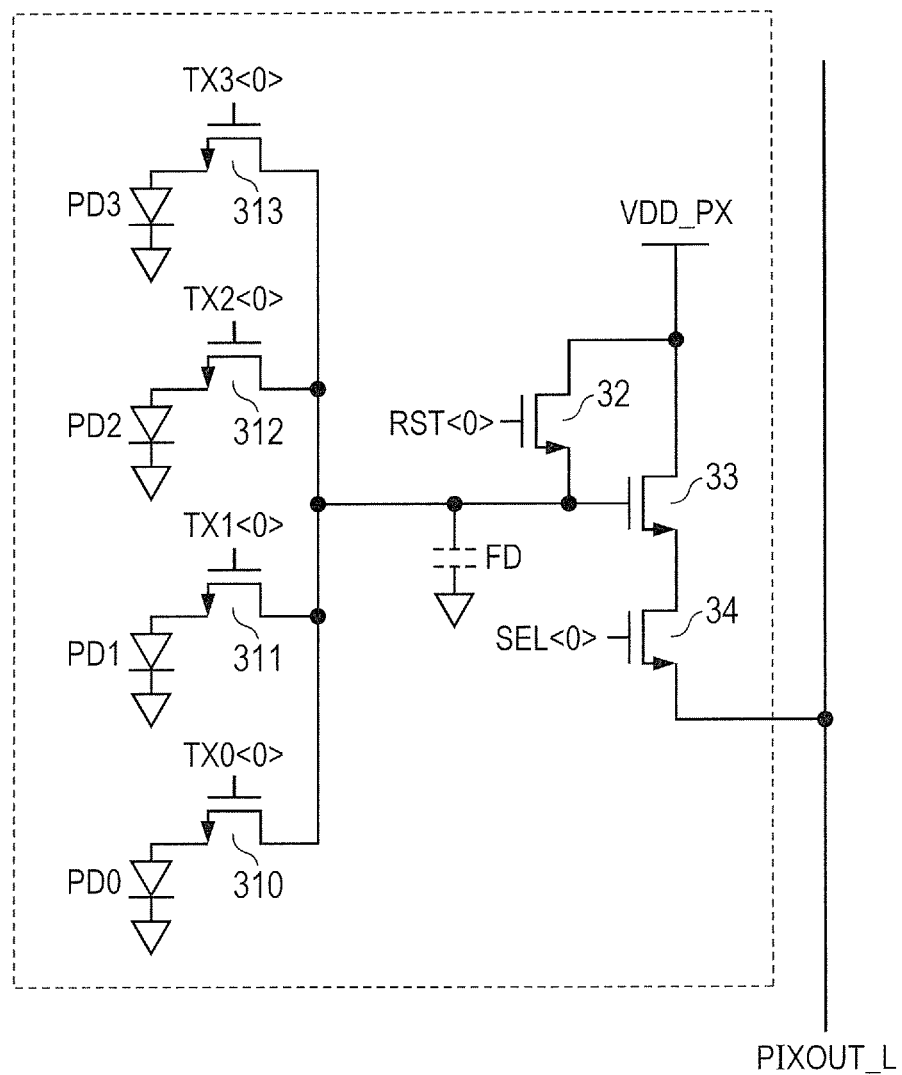
FIG. 4 is a circuit diagram of a pixel unit within the image sensing device according to the first embodiment.

Next, a description will be given of the pixel unit 23 of the sensor 15 according to the first embodiment. FIG. 4 shows a circuit diagram of the pixel unit within the image sensing device according to the first embodiment. The difference between the pixel units 23 placed within the pixel array 22 is only in their corresponding rows, and as for the circuit, the pixel units 23 use the same circuit. Thus, taking the pixel unit placed in the 0th row as an example, the circuit of the pixel unit 23 will be described.

As shown in FIG. 4, the pixel unit 23 includes photoelectric conversion elements (for example, photodiodes PD0 to PD3), transfer transistors 310 to 313, a reset transistor 32, an amplifier transistor 33, and a selection transistor 34. Note that the transfer transistors 310 to 313, the reset transistor 32, the amplifier transistor 33, and the selection transistor 34 are NMOS transistors.

The transfer transistors 310 to 313 are transistors provided corresponding to the photodiodes PD0 to PD3. The transfer transistors 310 to 313 function as switches whose open/closed state is controlled by transfer control signals TX- to TX3. The transfer transistors 310 to 313 are brought into conductive state (switch closed state) to transfer the charge accumulated in the photodiode corresponding to the floating diffusion FD. Although details will be described later, the sensor 15 according to the first embodiment controls the reading of pixel signals by transferring the charge to the floating diffusion FD for each photodiode.

The reset transistor 32 is provided between a power supply line VDD_PX and the floating diffusion DF. The reset transistor 32 is a switch whose open/closed state is controlled by a reset control signal RST. In the sensor 15 according to the first embodiment, the reset transistor 32 is brought into conductive state to set the potential of the floating diffusion FD to the reset level.

The amplifier transistor 33 is configured such that the floating diffusion DF is coupled to the gate and the drain is coupled to the power supply line VDD_PX. The source of the amplifier transistor 33 is coupled to the drain of the selection transistor 34. The selection transistor 34 is configured such that the selection signal is input to the gate and the source is coupled to the vertical read line PIXOUT_L. The amplifier transistor 33 generates a pixel signal according to the voltage level of the floating diffusion FD. The selection transistor 34 is a switch whose open/closed state is controlled by the selection signal SEL. In the sensor 15 according to the first embodiment, the selection transistor 34 is brought into conductive state to output the pixel signal, which is generated by the amplifier transistor 33, to the vertical read line PIXOUT_L.

Next, a description will be given of the analog/digital conversion circuit 24 of the sensor 15 according to the first embodiment. The analog/digital conversion circuit 24 according to the first embodiment includes an input terminal commonly provided in the transfer switches 25 and 26. The analog/digital conversion circuit 24 alternately performs the conversion of the dark level signal input through the transfer switch 25 into a digital value as well as the conversion of the pixel signal into a digital value, and the conversion of the dark level signal input through the transfer switch 26 into a digital value as well as the conversion of the pixel signal into a digital value. In other words, the analog/digital conversion circuit 24 converts input signals into digital values one by one in the order of input.

Figure 5:
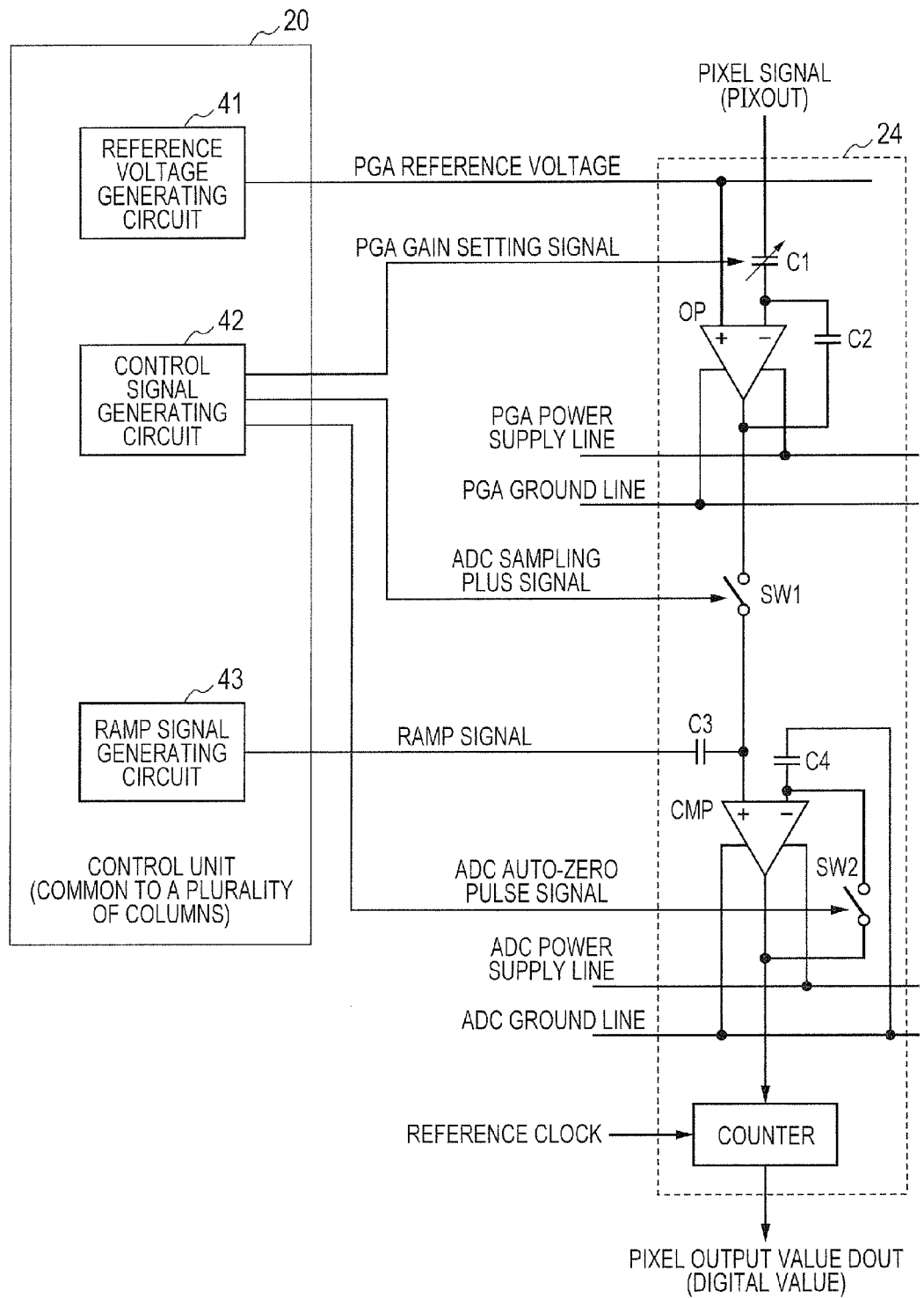
FIG. 5 is a circuit diagram of an analog/digital conversion circuit of the image sensing device according to the first embodiment.

Here, FIG. 5 shows a circuit diagram of the analog, digital conversion circuit 24 of the sensor 15 according to the first embodiment. In FIG. 5, the row controller 20 is shown to illustrate the component of the analog/digital conversion circuit 24. The analog/digital conversion circuit 24 is operated by receiving various control signals and voltage for operation from a reference voltage generating circuit 41, a control signal generating circuit 42, and a ramp signal generating circuit 43, which are included in the row controller 20. Further, the analog/digital conversion circuit 24 also includes an amplifier OP that functions as a programmable gain amplifier (hereinafter, referred to as PGA) as well as a comparator CMP that operates as an analog/digital converter.

As shown in FIG. 5, the analog/digital conversion circuit 24 includes the amplifier OP, comparator CMP, capacitors C1 to C4, and switches SW1 and SW2. The amplifier OP is configured such that a pixel signal is input to an inverting input terminal through the capacitor C1. The capacitor C2 is provided between an output terminal of the amplifier OP and the inverting input terminal. Then, a PGA reference voltage is given to a non-inverting input terminal of the amplifier OP from the reference voltage generating circuit 41. The capacitor C1 is variable, whose capacitance is determined by a PGA gain setting signal output by the control signal generating circuit 42. Here, the amplifier OP and the capacitors C1, C2 function as a programmable gain amplifier. The programmable gain amplifier makes the gain of the pixel signal variable, by varying the capacitance ratio of the capacitors C1 and C2 based on the PGA gain setting signal.

The comparator CMP is configured such that the capacitor C4 is coupled between the inverting input terminal and the ground line, and the non-inverting input terminal is coupled to the output terminal of the amplifier OP through the switch SW1. An end of the capacitor C3 is coupled to the non-inverting input terminal of the comparator CMP. The ramp signal is input to the other terminal of the capacitor C3 from the ramp signal generating circuit 43. Further, the switch SW2 is coupled between the inverting input terminal and non-inverting input terminal of the comparator CMP. The open/closed state of the switch SW1 is controlled by an ADC sampling pulse signal output by the control signal generating circuit 42. The open/closed state of the switch SW2 is controlled by an ADC auto-zero pulse signal output by the control signal generating circuit 42. Further, the analog/digital conversion circuit 11 includes a counter that counts the number of reference clocks according to the output value of the comparator CMP. The reference clock is output by an oscillator circuit, not shown, or the like. The analog/digital conversion circuit 24 stops the counting operation of the counter, in response to reversal of the magnitude relationship between the signal level of the ramp signal and the signal level, of the pixel signal. Then, the analog/digital conversion circuit 24 outputs the count value, which is output by the counter when stopping the operation, as a digital value.

Here, the comparator CMP and the capacitors C3, C4 function as a signal-slope integration AD conversion circuit. The single-slope integration AD conversion circuit uses the ramp signal that has a correlation with the count value of the counter for counting the output value of the comparator CMP, as the reference standard voltage. Then, the single-slope integration AD conversion circuit inputs the ramp signal to the comparator CMP, and compares the analog signal to be converted with the ramp signal. The single-slope integration AD conversion circuit holds the count value at the time the two signals match, and outputs the count value as the AD conversion result. Note that in the example shown in FIG. 5, the analog level of the pixel signal input from the programmable gain amplifier side is stored in the capacitors C3 and C4. Then, the single-slope integration AD conversion circuit according to the first embodiment compares the voltage generated by the charge accumulated in the two capacitors, by varying the voltage level of the ramp signal given to the other end of the capacitor C3.

Next, a description will be given of the operation of the sensor 15 according to the first embodiment. In the sensor 15 according to the first embodiment, the pixel unit 23 of the odd-numbered row and the pixel unit 23 of the even-numbered row are coupled to different vertical read lines, respectively, of a pair of two vertical read lines. Then, the transfer switch provided at an end of the two vertical read lines is turned on (closed state). In this way, the sensor 15 according to the first embodiment performs the conversion process of the pixel signal read from the pixel unit 23 and the reset process of the vertical read line to the dark level in parallel.

Figure 6:
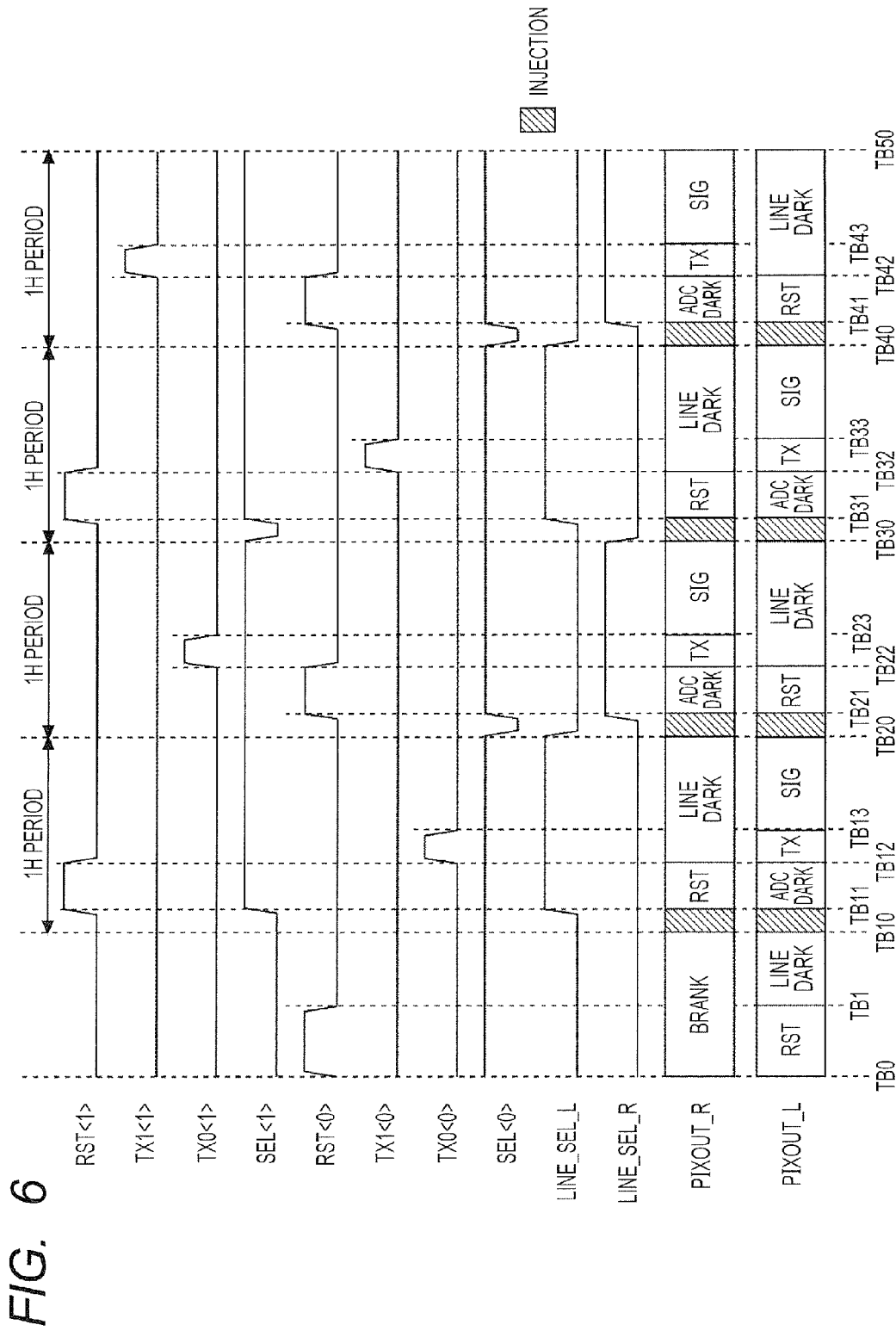
FIG. 6 is a timing chart showing a first operation example of the image sensing device according to the first embodiment.

Thus, FIG. 6 shows a timing chart illustrating a first operation example of the sensor 15 according to the first embodiment. Note that it is assumed that the switching timing of each operation and the circuit state for each process shown in FIG. 6 are controlled by the row controller 20 that functions as the timing control circuit.

As shown in FIG. 6, the sensor 15 according to the first embodiment alternately performs a reading of the pixel signal from the pixel unit 23 of the 0th row, and a reading of the pixel signal from the pixel unit 23 of the first row.

In the example shown in FIG. 6, the sensor 15 sets the read line selection signals LINE_SEL_L, LINE_SEL_R to a low level in the period between the timings TB0 and TB10. Then, the sensor 15 raises a reset control signal RST<0> and a selection signal SEL<0> in the period between the timings TB0 and TB1. In this way, the sensor 15 resets the floating diffusion FD within the pixel unit 23 of the 0th row to the dark level (RST in the figure). Next, at the timing TB1, the sensor 15 changes the rest control signal RST<0> from a high level to a low level, and ends the reset of the floating diffusion FD. After that, in the period between the timings TB1 and TB10, the sensor 15 maintains the selection signal SEL <0> at the high level, and reads the dark level of the vertical read line PIXOUT_L based on the dark level of the floating diffusion FD (LINE DARK in FIG. 6). The reset process of the vertical read line PIXOUT_L is started at the timing TB0. This is because the capacitance of the vertical read line PIXOUT_L is greater than the capacitance of the floating diffusion FD and it takes more time to rest the vertical read line PIXOUT_L than to reset the floating diffusion FD.

Next, the sensor 15 changes the read line selection signal LINE_SEL_L from the high level to the low level. At this time, the read line selection signal LINE_SFEL_R keeps the low level. In this way, the transfer switch 25 is switched to the on state, while the transfer switch 26 keeps the off state. Here, the voltage of the gate of the transistor configuring the transfer switch 25 changes in the switching of the transfer switch 25 to the on state from the off state. With this voltage change, injection occurs, causing noise to be generated in the read line selection signal LINE_SEL_L and in the line that couples the transfer switch 25 and the analog/digital conversion circuit 24. Thus, after the noise by the injection has stopped, the sensor 151 starts the analog/digital conversion process. The injection occurs when the transfer switches 25 and 26 are switched from the on state to the off state, and switched from the off state to the on state. For this reason, the sensor 15 is controlled in operation timing so as not to perform the analog/digital conversion process during the injection period also in the operation after the timing TB11.

Then, in the period from timing TB11 to timing TB12, the sensor 15 transfers the dark level from the vertical read line PIXOUT_L to the analog/digital conversion circuit 24 (ADC DARK in FIG. 6). After that, in the period from timing TB12 to timing TB13, the sensor 15 sets the transfer control signal TX0<0> to high level, and transfers the charge generated in the photodiode PD0 to the floating diffusion FD of the pixel unit 23 of the 0th row (TX in FIG. 6). Next, in the period from timing TB13 to timing TB20, the sensor 15 transfers the pixel signal, which is generated based on the charge read by the floating diffusion FD of the pixel unit 23 of the 0th row, to the vertical read line PIXOUT and the analog/digital conversion circuit 24 (SIG in FIG. 6).

In the sensor 15, the time required to output one pixel signal is referred to as 1H period. In the example shown in FIG. 6, 1H period is the time between the timing TB10 and the timing TB20. Further, the time from timing TB20 to timing TB30, the time from timing TB30 to timing TB40, and the time from timing TB40 to timing TB50 are the same as the time from timing TB10 to timing TB20.

Further, the sensor 15 according to the first embodiment generates the final pixel information Do with the difference between the dark level and pixel signals as the value of the pixel signal. In this way, the sensor 15 according to the first embodiment removes noise superimposed on the dark level signal and outputs the pixel information Do with a low noise level.

Further, in the period from timing TB10 to timing TB20, the sensor 15 according to the first embodiment performs a reset operation of the vertical read line PIXOUT_R corresponding to the transfer switch 26 that is brought into the off state. More specifically, in the injection period between the timing TB 10 and the timing TB11, the sensor 15 sets the floating diffusion FD of the pixel unit 23 of the first row to the dark level by switching the reset control signal RST<1> and the selection signal SEL<1> from the low level to the high level. Further, in the period from timing TB12 to timing TB20, the sensor 15 reads the dark level within the pixel unit 23 of the first row to the vertical read line PIXOUT_R.

Next, in the period from timing TB20 to timing TB30, the vertical read line on which the pixel signal reading is performed and the virtual read line on which the reset process is performed are reversed from those in the period from, timing TB10 to timing TB20. In this state, the sensor 15 performs the process of the period from timing TB10 to timing TB20. More specifically, in the state in which the transfer switch 25 is turned off and the transfer switch 26 is turned on, the sensor 15 performs the following operations: a transfer of the dark level, which is read to the vertical read line PIXOUT_R, to the analog/digital conversion circuit 24; a transfer of the charge from the photodiode PD0 within the pixel unit 23 of the first row to the floating diffusion FD; and a reading of the pixel signal to the vertical read line PIXOUT_R and to the analog/digital conversion circuit 24. Further, in the pixel unit 23 of the 0th row, the sensor 15 performs a reset process for setting the floating diffusion DF within the pixel unit 23 of the 0th row to the dark level, as well as a reading of the dark level to the vertical read line PIXOUT_L.

Next, in the period from timing TB30 to timing TB40, the vertical read line on which the pixel signal reading is performed and the vertical read line on which the reset process is performed are reversed from those in the period from timing TB20 to timing TB30. In this state, the sensor 15 performs the process of the period from timing TB20 to timing TB30. More specifically, in the state in which the transfer switch 25 is turned on and the transfer switch 26 is turned off, the sensor 15 performs the following operations: a transfer of the dark level that, which is read to the vertical read line PIXOUT_L, to the analog/digital conversion circuit 24; a transfer of the charge from the photodiode PD1 within the pixel unit 23 of the 0th row to the floating diffusion FD; and a reading of the pixel signal to the vertical read line PIXOUT_R and to the analog digital conversion circuit 24. Further, in the pixel unit 23 of the first row, the sensor 15 performs a reset process for setting the floating diffusion FD within the pixel unit 23 of the first row to the dark level, as well as a reading of the dark level to the vertical read line PIXOUT_R.

Next, in the period from timing TB20 to timing TB30, the vertical read line on which the pixel signal reading is performed and the virtual read line on which the reset process is performed are reversed from those in the period from timing TB10 to timing TB20. In this state, the sensor 15 performs the process of the period from timing TB10 to timing TB20. More specifically, in the state in which the transfer switch 25 is turned off and the transfer switch 26 is turned on, the sensor 15 performs the following operations: a transfer of the dark level, which is read to the vertical read line PIXOUT_R, to the analog/digital conversion circuit 24; a transfer of the charge from the photodiode PD0 within the pixel unit 23 of the first row to the floating diffusion FD; and a reading of the pixel signal to the vertical read line PIXOUT_R and to the analog digital conversion circuit 24. Further, in the pixel unit 23 of the 0th row, the sensor 15 performs a reset process for setting the floating diffusion FD within the pixel unit 23 of the 0th row to the dark level, as well as a reading of the dark level to the vertical read line PIXOUT_L.

Next, in the period from timing TB40 to timing TB50, the vertical read line on which the pixel signal reading is performed and the virtual read line on which the reset process is performed are reversed from those in the period from timing TB30 to timing TB40. In this state, the sensor 15 performs the process of the period from timing TB30 to timing TB40. More specifically, in the state in which the transfer switch 25 is turned off and the transfer switch 26 is turned on, the sensor 15 performs the following operations: a transfer of the dark level, which is read to the vertical read line PIXOUT_L, to the analog/digital conversion circuit 24; a transfer of the charge from the photodiode PD1 within the pixel unit 23 of the first row to the floating diffusion FD; and a reading of the pixel signal to the vertical read line PIXOUT_R and to the analog/digital conversion circuit 24. Further, in the pixel unit 23 of the first row, the sensor 15 performs a reset process for setting the floating diffusion FD within the pixel unit 23 of the first row to the dark level, as well as a reading of the dark revel to the vertical read line PIXOUT_R.

Note that in the sensor 15 according to the first embodiment, the analog/digital conversion circuit 24, upon receiving transfer of the dark level and pixel signals, converts the transferred signal level into a digital value and outputs a pixel output value DOUT. In other words, in the sensor 15 according to the first embodiment, the timing control circuit (for example, the row controller 20) controls the pixel units, the transfer switches 25 and 26, and the analog/digital circuit 24 in such a way that the reset process and the conversion output process are performed in parallel in one period. Here, in the reset process, the analog/digital conversion circuit 24 resets the signal level of the reset target vertical read line coupled to one transfer switch controlled to be closed, either the transfer switch 25 or the transfer switch 26, as well as the signal level of the floating diffusion within the pixel unit coupled to the reset target vertical read line, to the dark level. Further, in the output conversion process, the analog/digital conversion circuit 24 performs the following operations: a conversion of the dark level signal with dark level output from the read target vertical read line coupled to one transfer switch controlled to be conductive, either the transfer switch 25 or the transfer switch 26, into a digital value; an output of the pixel signal to the analog/digital conversion circuit from the pixel unit coupled to the read target vertical read line; and a conversion of the pixel signal into a digital value.

Figure 7:
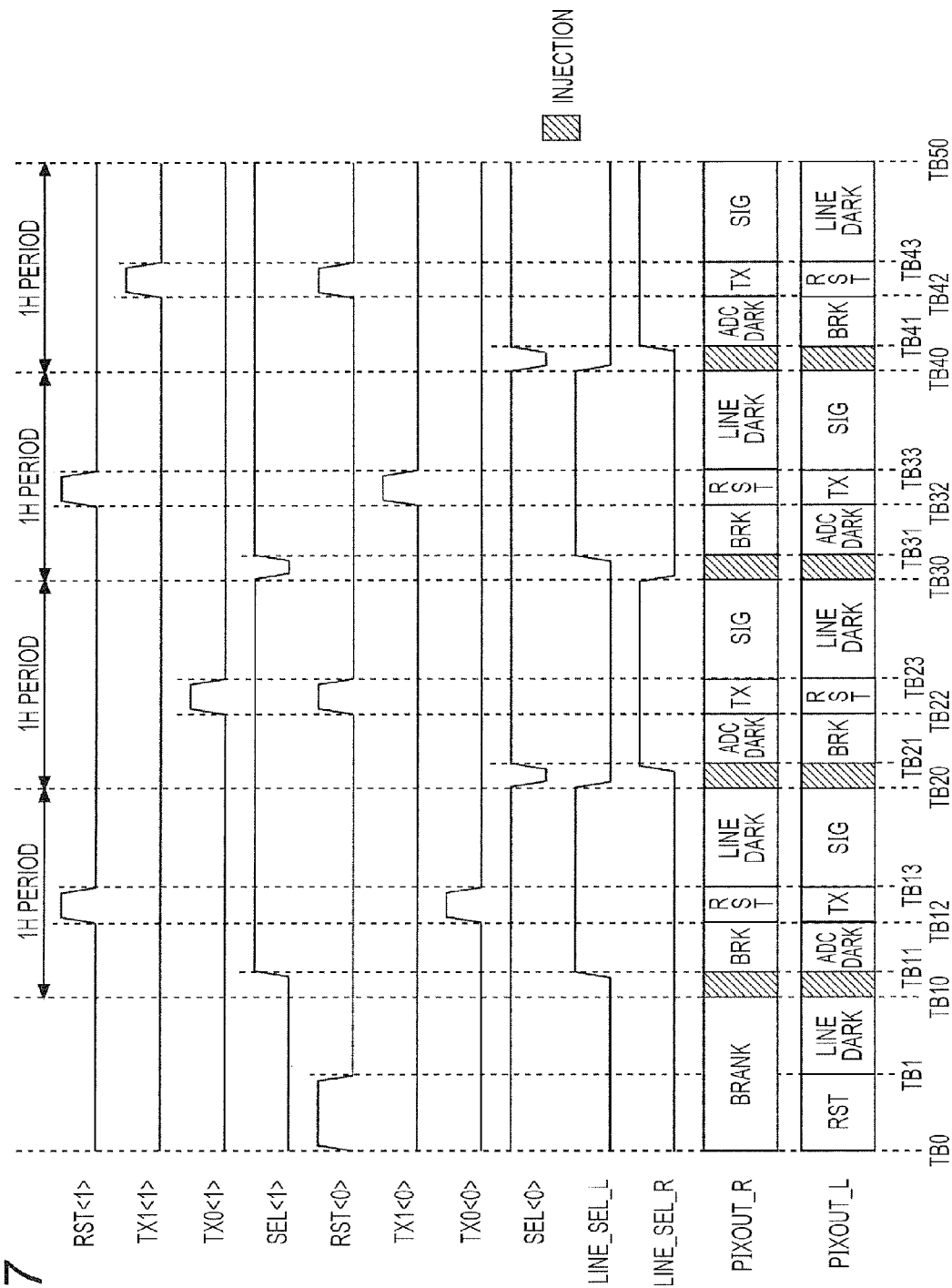
FIG. 7 is a timing chart showing a second operation example of the image sensing device according to the first embodiment.

The timing chart described in FIG. 6 is an example, and there may be another operation timing for the operation of the sensor 15. Thus, FIG. 7 shows a timing chart illustrating a second operation example of the sensor 15 according to the first embodiment. In the example shown in FIG. 7, the reset timing of the floating diffusion FD within the pixel unit 23 coupled to the vertical read line, which is controlled to be in the off state, is different from the example shown in FIG. 6. More specifically, the example shown in FIG. 7 performs the reset process of the floating diffusion FD within the pixel unit coupled to the vertical read line corresponding to the transfer switch controlled to be turned off, at a timing of transferring the charge of the photodiode to the floating diffusion FD within the pixel unit 23 coupled to the vertical read line corresponding to the transfer switch controlled to be turned on. Further, the example shown in FIG. 7 performs the reset process of the vertical read line corresponding to the transfer switch controlled to be turned off, at a timing of transferring the pixel signal to the analog/digital conversion circuit 24 from the inside of the pixel unit 23 coupled to the vertical read line corresponding to the transfer switch controlled to be turned on.

Figure 8:
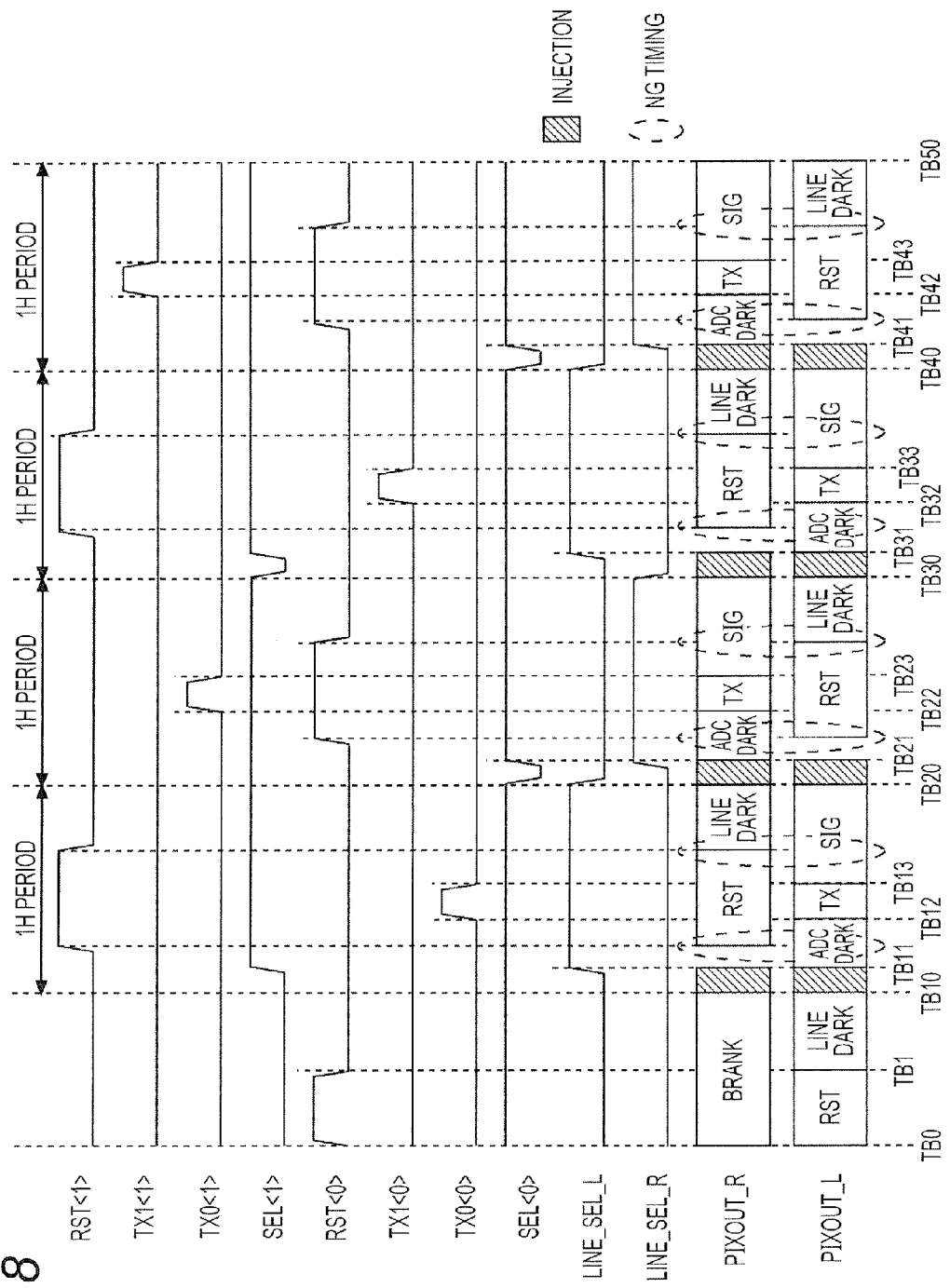
FIG. 8 is a timing chart showing a third operation example of the image sensing device according to the first embodiment.

As described above, the reset process on the vertical read line may be performed at various timings. However, there is also undesired timing of the reset process. Thus, as an undesired operation timing, FIG. 8 shows a timing chart illustrating a third operation example of the image sensing device according to the first embodiment. In the example shown in FIG. 8, the rising timing of the reset control signal is present during the period in which the dark level, which has been read to the vertical read line corresponding to the transfer switch controlled to be turned on, is transferred to the analog/digital conversion circuit 24. Further, in the example shown in FIG. 8, the falling timing of the reset control signal is present during the period in which the pixel signal is transferred to the analog/digital conversion circuit 24 from the inside of the pixel unit 23 coupled to the vertical read line corresponding to the transfer switch controlled to be turned on. In this way, when the switching of the logic level such as the reset control signal RST occurs during the period in which the signal to be converted is transferred to the analog/digital conversion circuit 24, the power supply noise increases as the amount of current consumption within the sensor 15 increases during the conversion process of the analog, digital conversion circuit 24. Such an increase of the power supply noise may cause an error in the conversion process result of the analog/digital conversion circuit 24. For this reason, in the sensor 15 according to the first embodiment, the row controller 20 switches the logic level of the reset control signal for instructing the pixel unit to perform a reset operation in a period other than the period in which the analog/digital conversion circuit performs the analog/digital conversion process that converts the signal with analog value into a digital value.

Figure 9:
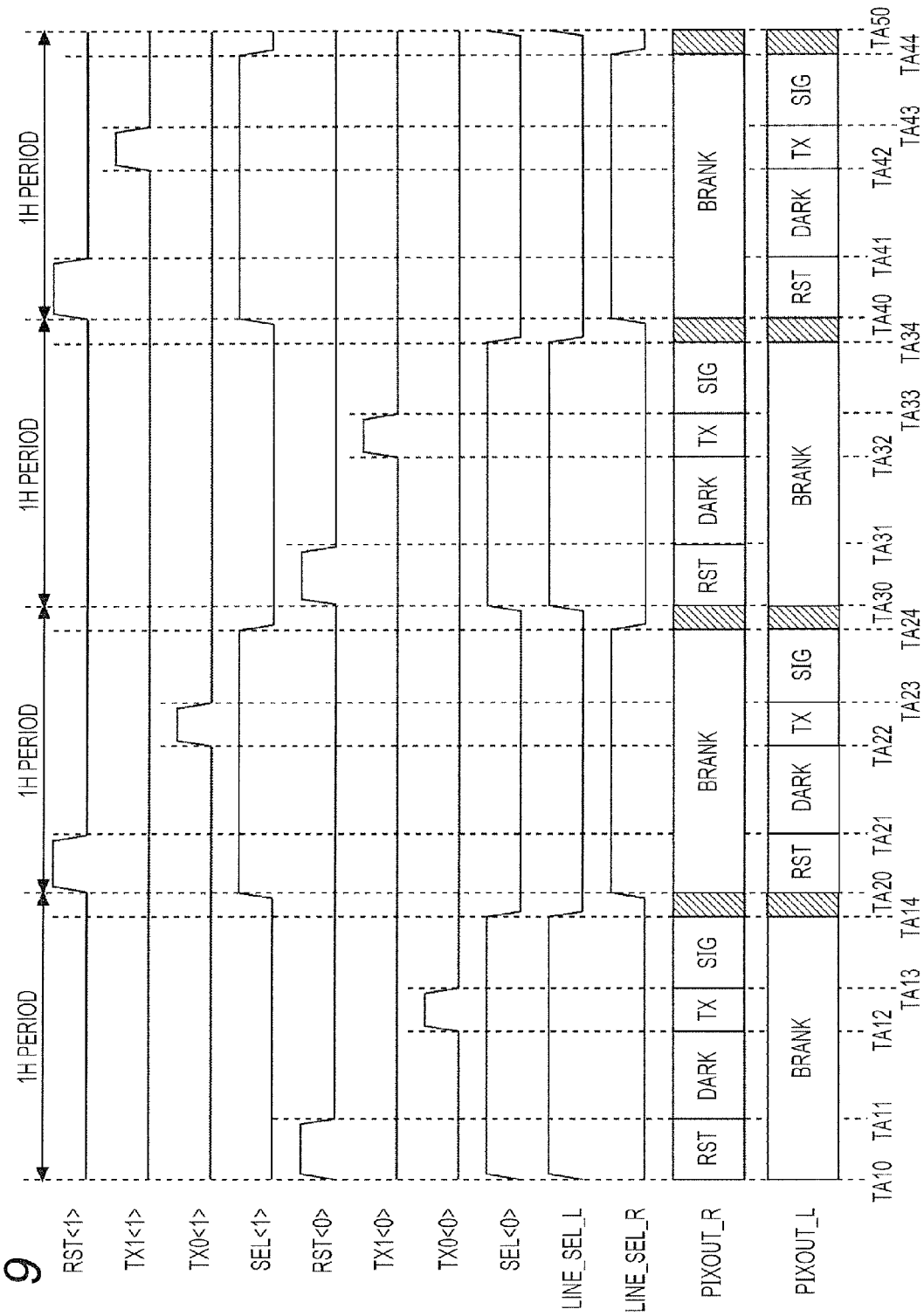
FIG. 9 is a timing chart showing a fourth operation example of the image sensing device according to the first embodiment.

Further, in the sensor 15 according to the first embodiment, it is also possible to perform the reset process of the vertical read line for each pixel unit and the signal transfer process to the analog/digital conversion circuit 24 sequentially, instead of performing the reset process of the vertical read line and the signal transfer process to the analog/digital conversion process 24 in parallel. Thus, FIG. 9 shows a timing chart illustrating a fourth operation example of the sensor 15 according to the first embodiment. In the example shown in FIG. 9, no operation is performed on the other pixel unit until the reset process of the vertical read line on the pixel from which the pixel signal is read as well as the signal transfer process to the analog/digital conversion circuit 24 are completed. Further, in the example shown in FIG. 9, the reading of the dark level to the vertical read line and the transfer of the dark level to the analog/digital conversion circuit 24 are performed as a single process. Thus, in FIG. 9, the reading of the dark level of the analog/digital conversion circuit 24 is shown as DARK. Further, in the example shown in FIG. 9, the pixel signals are read from the photodiodes in order as follows: the photodiode PD0 of the pixel unit 23 in the 0th row, the photodiode PD0 of the pixel unit 23 in the first row, the photodiode PD1 of the pixel unit 23 in the 0th row, and the photodiode PD1 of the pixel unit 23 of the first row. At this time, the vertical read line coupled to the pixel unit 23, which is not a target of reading signals, is blank.

Here, a description will be given of the effect of reducing the read time when the reset process of the vertical read line and the signal transfer process to the analog/digital conversion circuit 24 are performed in parallel in the sensor 15 according to the first embodiment.

First, the statically determinate time x(t) is shown in equation (1) when the input capacitance of the analog/digital conversion circuit 24 is set to the dark level, in the case in which the reading of the dark level to the vertical read line and the transfer of the dark level to the analog/digital conversion circuit 24 are performed as a single process as in the example shown in FIG. 9. Here, the statically determinate time is the time when the signal level reaches a voltage of 90% of the signal level that is assumed to be the dark level, from the minimum voltage level (for example, ground voltage). Further, in the following description, it is assumed that gm represents the transconductance of the amplifier transistor 33, Rwire represents the resistance value of the parasitic resistance of the vertical read line, Cline represents the capacitance value of the parasitic capacitance of the vertical read line, resistance Ri represents the resistance value of the load resistance coupled to the vertical read line, C_ADC represents the capacitance value of the input capacitance of the analog/digital conversion circuit 24, and t represents the time.

[Equation 1]

$$x(t) = 1 - \frac{gm}{(1+gm*Rwire)*(Cline+C\_ADC)} e^{\left(-\frac{gm*Rwire+gm*Ri+1}{(1+gm*Rwire)*Ri*(Cline+C\_ADC)}t\right)} \quad (1)$$

On the other hand, the statically determinate time x_line(t) is shown in equation (2) when the vertical read line is set to the dark level, in the case in which the reading of the dark level to the vertical read line and the transfer of the dark level to the analog/digital conversion circuit 24 are performed as separate processes as in the example shown in FIG. 6.

[Equation 2]

$$x\_line(t) = 1 - \frac{gm}{(1+gm*Rwire)*(Cline)} e^{\left(-\frac{gm*Rwire+gm*Ri+1}{(1+gm*Rwire)*Ri*Cline}t\right)} \quad (2)$$

Further, the statically determinate time x_ADC(t) is shown in equation (3) when the input capacitance of the analog/digital conversion circuit 24 is set to the dark level, in the case in which the reading of the dark level to the vertical read line and the transfer of the dark level to the analog/digital conversion circuit 24 are performed as separate processes as in the example shown in FIG. 6.

[Equation 3]

$$x\_ADC(t) = 1 - \frac{gm}{(1+gm*Rwire)*(C\_ADC)} e^{\left(-\frac{gm*Rwire+gm*Ri+1}{(1+gm*Rwire)*Ri*C\_ADC}t\right)} \quad (3)$$

When comparing equations (1) and (3), the term with respect to the capacitance value of the molecule in equation (3) is smaller than in equation (1). In other words, when the reading of the dark level to the vertical read line and the transfer of the dark level to the analog/digital conversion circuit 24 are performed in parallel as separate processes, it is possible to reduce the time required to read the dark level within 1H period. Further, it can be found that the statically determinate time x_line shown in equation (2) is shorter than the time for reading the pixel signal, when taking into account the fact that the pixel signal is read while charging the parasitic capacitance of the vertical read line and the input capacitance of the analog/digital conversion circuit 24. In other words, in the sensor 15 according to the first embodiment, by performing the reading of the dark level to the vertical read line and the transfer of the dark level to the analog/digital conversion circuit 24 in parallel as separate processes, it is possible to reduce the required time by 1H period, compared to the case that the reading of the dark level to the vertical read line and the transfer of the dark level to the analog/digital conversion circuit 24 are performed as a single process.

According to the above description, in the sensor 15 according to the first embodiment, the pixel units arranged in the same column are divided into two groups. Then, the sensor 15 according to the first embodiment performs the anal digital conversion process for reading the dark level and pixel signal output from the pixel unit belonging to one group, and the reset process for resetting the corresponding vertical read line at the dark level output from the pixel unit belonging to the other group, in parallel. Further, in the sensor 15 according to the first embodiment, the analog/digital conversion process and the reset process are performed alternately. With this configuration, in the sensor 15 according to the first embodiment, the voltage of the vertical read line is set to the dark level before the dark level output from the pixel unit belonging to one group is transferred to the analog/digital conversion circuit 24. In this way, it is possible to reduce the time for transferring the dark level to the analog/digital conversion circuit 24. In addition, the sensor 15 according to the first embodiment is designed to perform the analog/digital conversion process and the reset process in parallel, in order to approximate the process to be performed in 1H period required to read the pixel signal for one pixel, to the time required for the analog/digital process as much as possible. In this way, it is possible to reduce the process time by 1H period.

In other words, in the sensor 15 according to the first invent, it is possible to reduce the time required to read the pixel signal of one pixel. Further, in the sensor 15 according to the first embodiment, the time required to read the pixel signal of one pixel can be reduced, so that it is possible to increase the number of pixels that can be read in a predetermined period. Studies conducted by the inventors have shown that, when performing the reading of the dark level to the vertical read line and the transfer of the dark level to the analog/digital conversion circuit 24 in parallel as separate processes, the required time is reduced by about 10% to 20% compared to performing the reading of the dark level to the vertical read line and the transfer of the dark level to the analog/digital conversion circuit 24 as a single process.

Further, when considering the increase in the speed of reading pixel signals, pixel signals read from different pixel units may be converted in parallel by using a plurality of analog/digital conversion circuits. In this case, however, there is a problem that the number of analog/digital conversion circuits per column increases. On the other hand, in the sensor 15 according to the first embodiment, one analog/digital conversion circuit 24 is provided corresponding to the pixel units of one column. Thus, the sensor 15 according to the first embodiment can increase the speed of reading pixel signals without increasing the circuit size. In particular, the number of pixels of the sensor 15 has increased in recent years and there is a high demand for reducing the circuit size. For this reason, the effect of being able to increase the speed of reading without increasing the circuit size is considerable.

Second Embodiment

In the second embodiment, a pixel unit 23a which is another form of the pixel unit 23 will be described. The pixel unit 23a is a pixel unit including two photodiodes. Further, in the second embodiment, the sensor 15 including the pixel unit 23a is referred to as a sensor 15a. Thus, FIG. 10 shows a block diagram of the sensor 15a according to the second embodiment.

Figure 10:
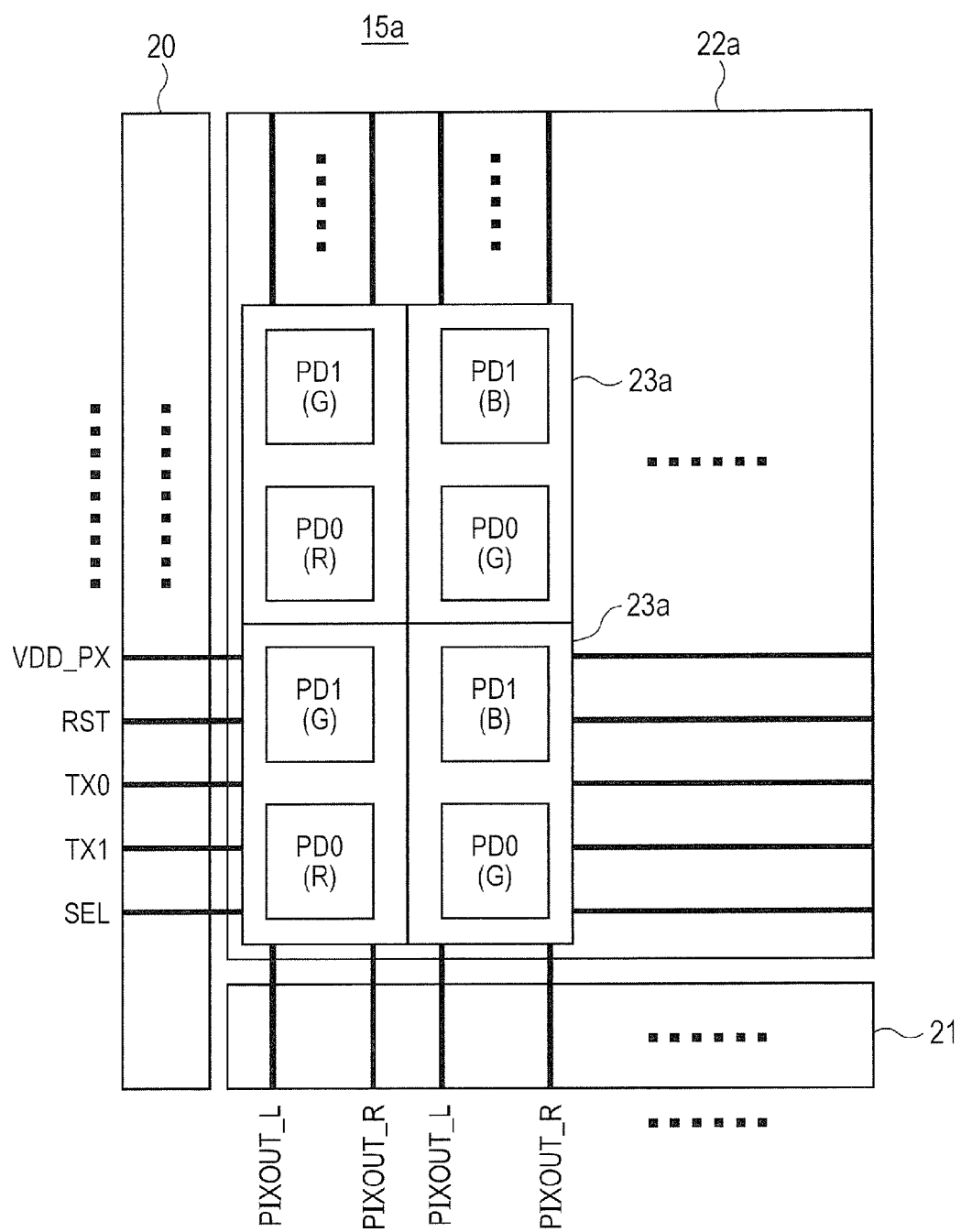
FIG. 10 is a block diagram of an image sensing device according to a second embodiment.

As shown in FIG. 10, the sensor 15a according to the second embodiment includes a pixel array 22a in which pixel units 23a are arranged in a lattice pattern. In the pixel unit 23a according to the second embodiment, the number of photodiodes per pixel unit is two. Thus, in the pixel array 22a according to the second embodiment, color filters are arranged in a Bayer pattern by using adjacent pixel units of two columns. In addition, also in the sensor 15a according to the second embodiment, two vertical read lines are provided corresponding to the pixel units of one column.

Figure 11:
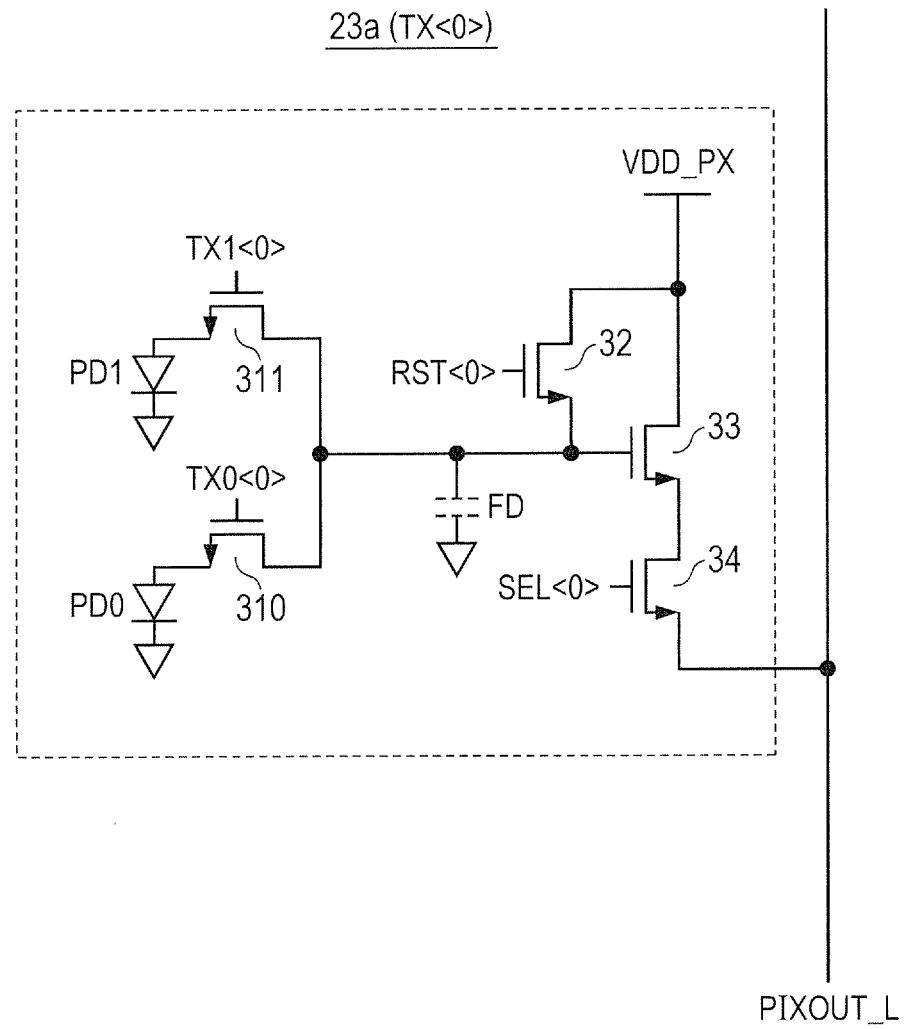
FIG. 11 is a circuit diagram of a pixel unit within the image sensing device according to the second embodiment.

Next, a description will be given of the circuit of the pixel unit 23a according to the second embodiment. Thus, FIG. 11 shows a circuit diagram of the pixel unit 23a within the sensor 15a according to the second embodiment. As shown in FIG. 11, the pixel unit 23a according to the second embodiment includes two diodes of photodiodes PD0 and PD1. In other words, the pixel unit 23a is configured such that the photodiodes PD2, PD3 and the transfer transistors 312, 313 are removed from the pixel unit 23 according to the first embodiment.

The operation when using the pixel unit 23a according to the second embodiment is substantially the same as the operation of the timing chart shown in FIG. 6, so that the description thereof is omitted here.

According to the above description, it can be seen that even if the number of photodiodes included in the pixel unit 23 according to the first embodiment is reduced, it is possible to increase the speed of reading pixel signals, as in the case of the pixel unit 23 according to the first embodiment.

Third Embodiment

In the third embodiment, a pixel unit 23b which is another form of the pixel unit 23 will be described. The pixel unit 23b is a pixel unit including one photodiode. Further, in the third embodiment, the sensor 15 including the pixel unit 23b is referred to as a sensor 15b. Thus, FIG. 12 shows a block diagram of the sensor 15b according to the third embodiment.

Figure 12:
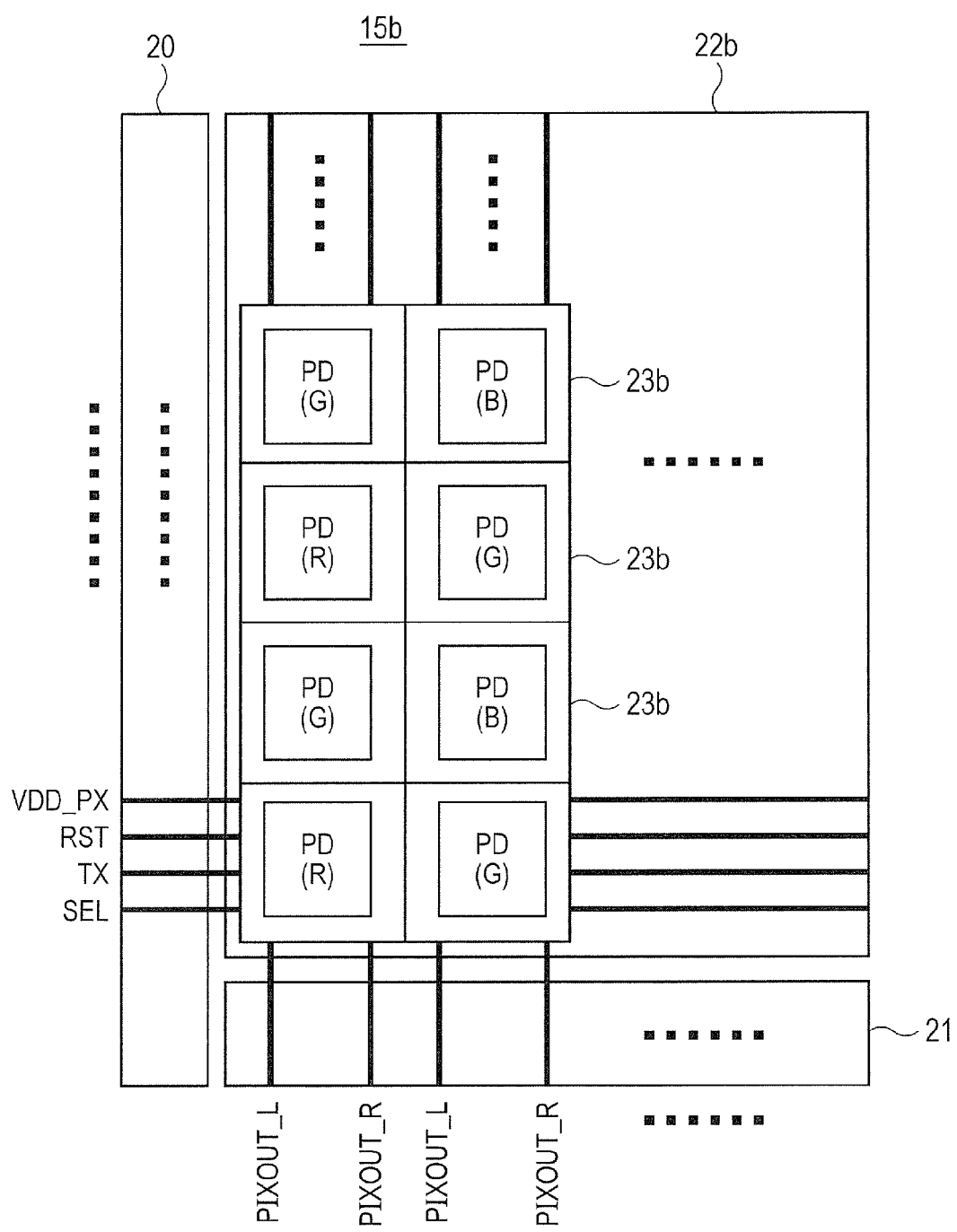
FIG. 12 is a block diagram of an image sensing device according to a third embodiment.

As shown in FIG. 12, the sensor 15b according to the third embodiment includes a pixel array 22b in which pixel units 23b are arranged in a lattice pattern. In the pixel unit 23b according to the third embodiment, the number of photodiodes per pixel unit is one. Thus, in the pixel array 22b according to the third embodiment, color filters are arranged in the Bayer pattern by using adjacent pixel units of two rows and two columns. In addition, also in the sensor 15b according to the third embodiment, two vertical read lines are provided corresponding to the pixel units of one column.

Figure 13:
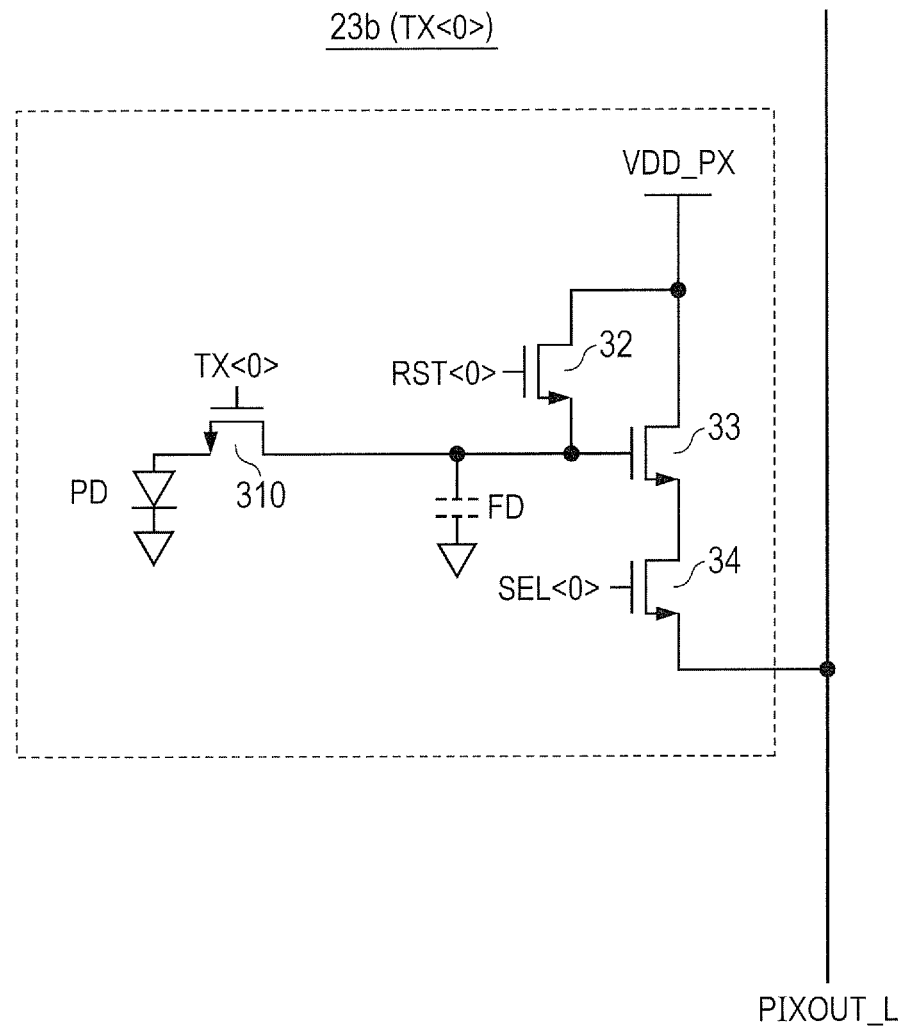
FIG. 13 is a circuit diagram of a pixel unit within the image sensing device according to the third embodiment.

Next, a description will be given of the circuit of the pixel unit 23b according to the third embodiment. Thus, FIG. 13 shows a circuit diagram of the pixel unit 23b within the sensor 15b according to the third embodiment. As shown in FIG. 13, the pixel unit 23b according to the third embodiment includes one photodiode, a photodiode PD. In other words, the pixel unit 23b is configured such that the photodiodes PD1, PD2, PD3 and the transfer transistors 311, 312, 313 are removed from the pixel unit 23 according to the first embodiment.

Figure 14:
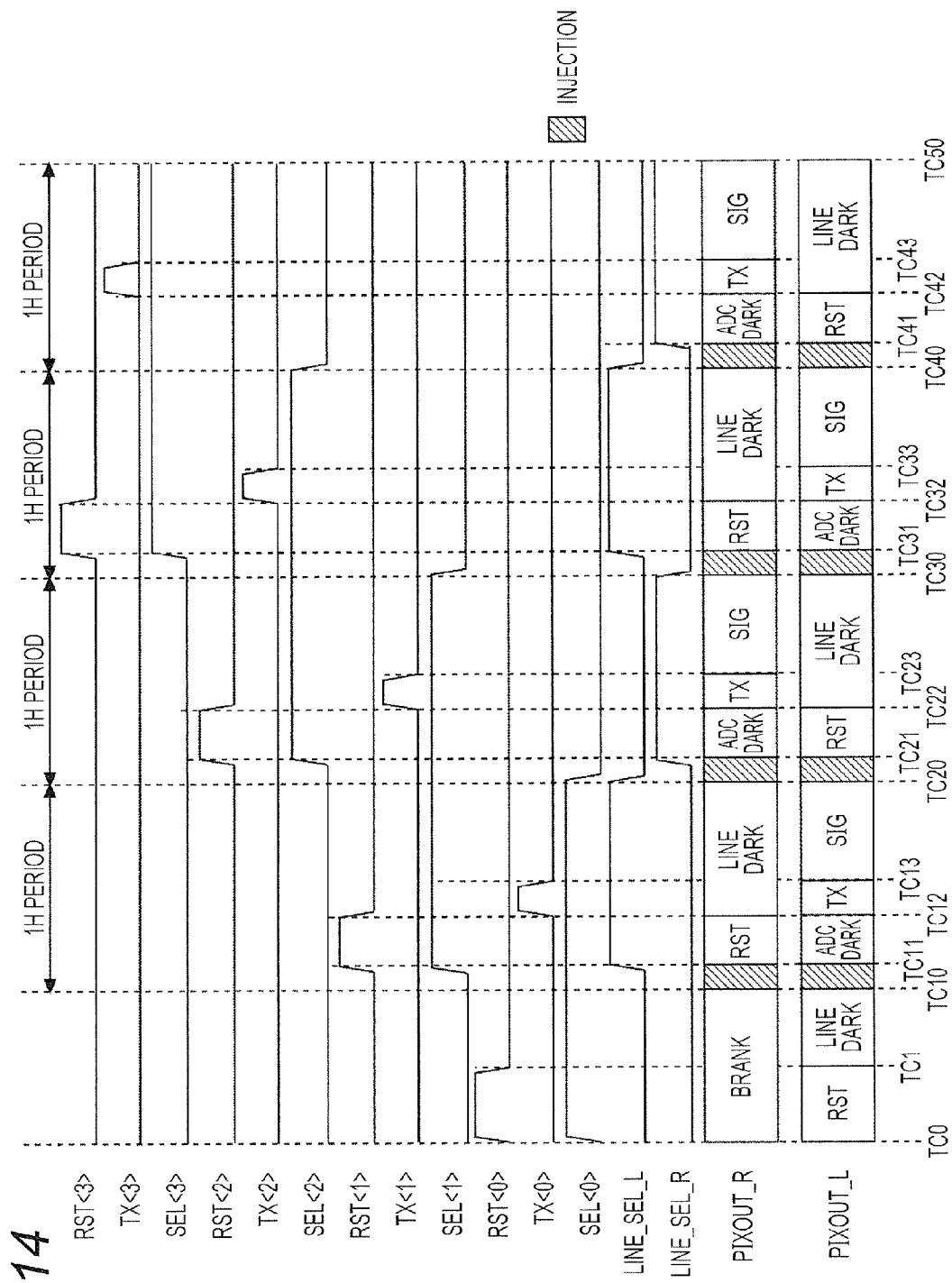
FIG. 14 is a timing chart showing an example of the operation of the image sensing device according to the third embodiment.

Next, a description will be given of the operation of the pixel unit 23b according to the third embodiment. Thus, FIG. 14 shows a timing chart illustrating an example of the operation of an image sensing device according to the third embodiment. As shown in FIG. 14, the sensor 15b according to the third embodiment resets the vertical read line PIXOUT_L, which is coupled to the pixel unit 23b of the first row, to the dark level during the period in which the dark level and pixel signal output from the pixel unit 23b of the 0th row are transferred to the analog/digital conversion circuit 24. Further, the sensor 15b according to the third embodiment resets the vertical read line PIXOUT_R, which is coupled to the pixel unit 23b of the second row, to the dark level during the period in which the dark level and pixel signal output from the vertical read line PIXOUT_L coupled to the pixel unit 23b of the first row are transferred to the analog/digital conversion circuit 24. In this way, the sensor 15b according to the third embodiment performs the pixel signal reading process by switching between the vertical read line for transferring the dark level and pixel signals to the analog/digital conversion circuit 24 and the vertical read line for resetting, with respect to the vertical read line PIXOUT_R and the vertical read line PIXOUT_L.

According to the above description, it can be seen that even if the number of photodiodes included in the pixel unit 23 according to the first embodiment is reduced, it is possible to increase the speed of reading pixel signals, as in the case of the pixel unit 23 according to the first embodiment.

Fourth Embodiment

In the fourth embodiment, a pixel unit 23c which is still another form of the pixel unit 23 will be described. The pixel unit 23c is a pixel unit in which a light receiving element for one pixel is configured by using two photodiodes, which includes two receiving elements. Further, in the fourth embodiment, the sensor 15 including the pixel unit 23c is referred to as a sensor 15c. Thus, FIG. 15 shows a block diagram of the sensor 15c according to the fourth embodiment.

Figure 15:
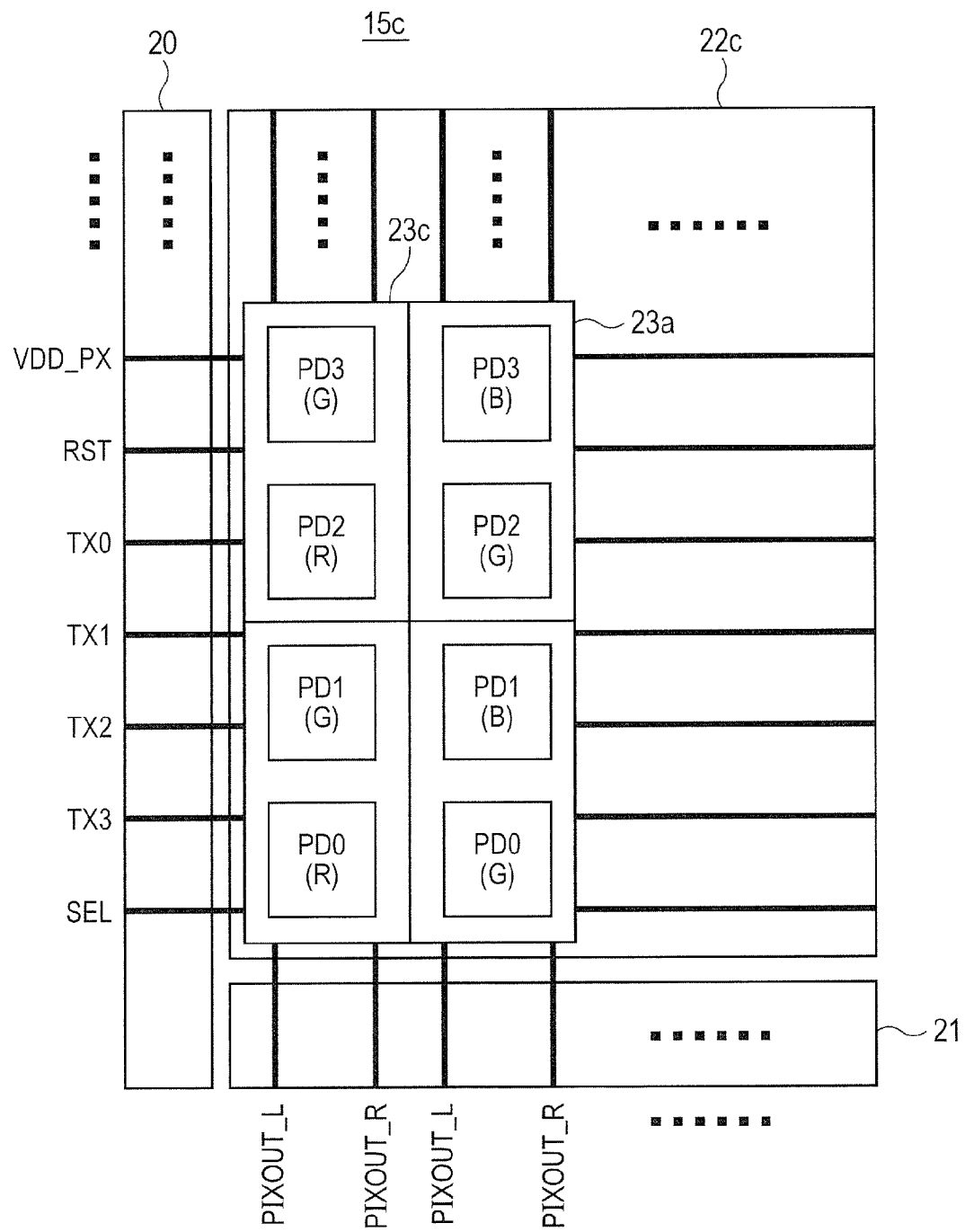
FIG. 15 is a block diagram of an image sensing device according to a fourth embodiment.

As shown in FIG. 15, the sensor 15c according to the fourth embodiment includes a pixel array 22c in which pixel units 23c are arranged in a lattice pattern. In the pixel unit 23c according to the fourth embodiment, the number of photodiodes per pixel unit is two. Thus, in the pixel array 22c according to the fourth embodiment, color filters are arranged in the Bayer pattern by using adjacent pixel units of two columns. In addition, also in the sensor 15c according to the fourth embodiment, two vertical read lines are provided corresponding to pixel units of one column. Note that the photodiode included in the pixel unit 23c includes two photodiodes.

Figure 16:
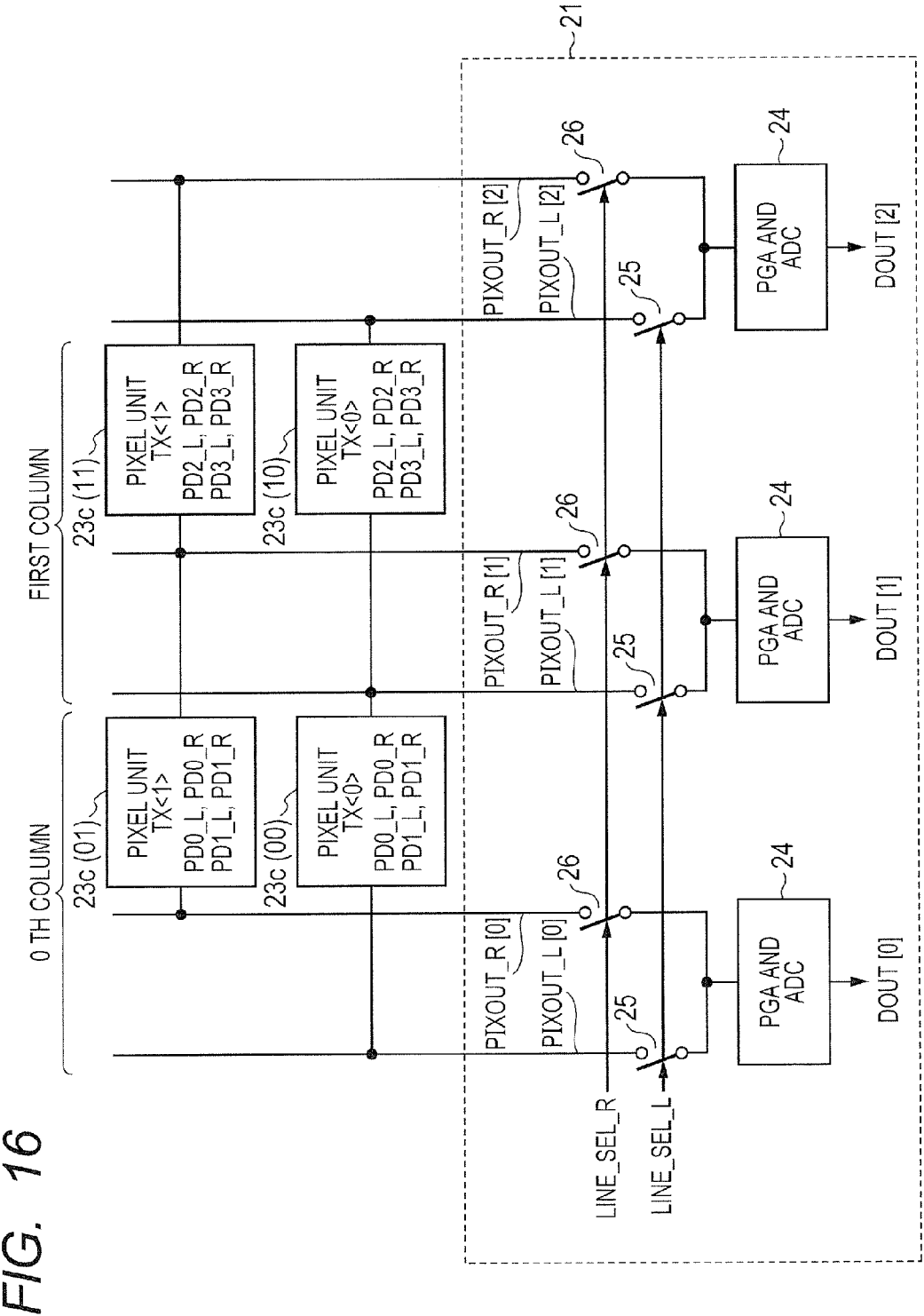
FIG. 16 is a block diagram showing a configuration of the vertical read line and transfer switch of the image sensing device according to the fourth embodiment.

Next, a description will be given of the configuration of the vertical read line and transfer switch of the sensor 15c according to the fourth embodiment. Thus, FIG. 16 shows a block diagram illustrating the configuration of the vertical read line and transfer switch of the sensor 15c according to the fourth embodiment. Note that in FIGS. 16 to 18, the row number and column number in which each pixel unit 23 is placed are given in parentheses.

As shown in FIG. 16, the pixel unit 23c according to the fourth embodiment also coupled to the vertical read line PIXOUT_L or vertical PIXOUT_R of the corresponding column, in addition to the vertical read line PIXOUT_L or vertical reading PIXOUT_R corresponding to the column in which the pixel unit 23c is placed. In other words, in the sensor 15c according to the fourth embodiment, the vertical read line is shared with the adjacent column. This is because one light receiving element within the pixel unit 23 is configured with two photodiodes, and pixel signals generated in the two photodiodes are read separately.

Figure 17:
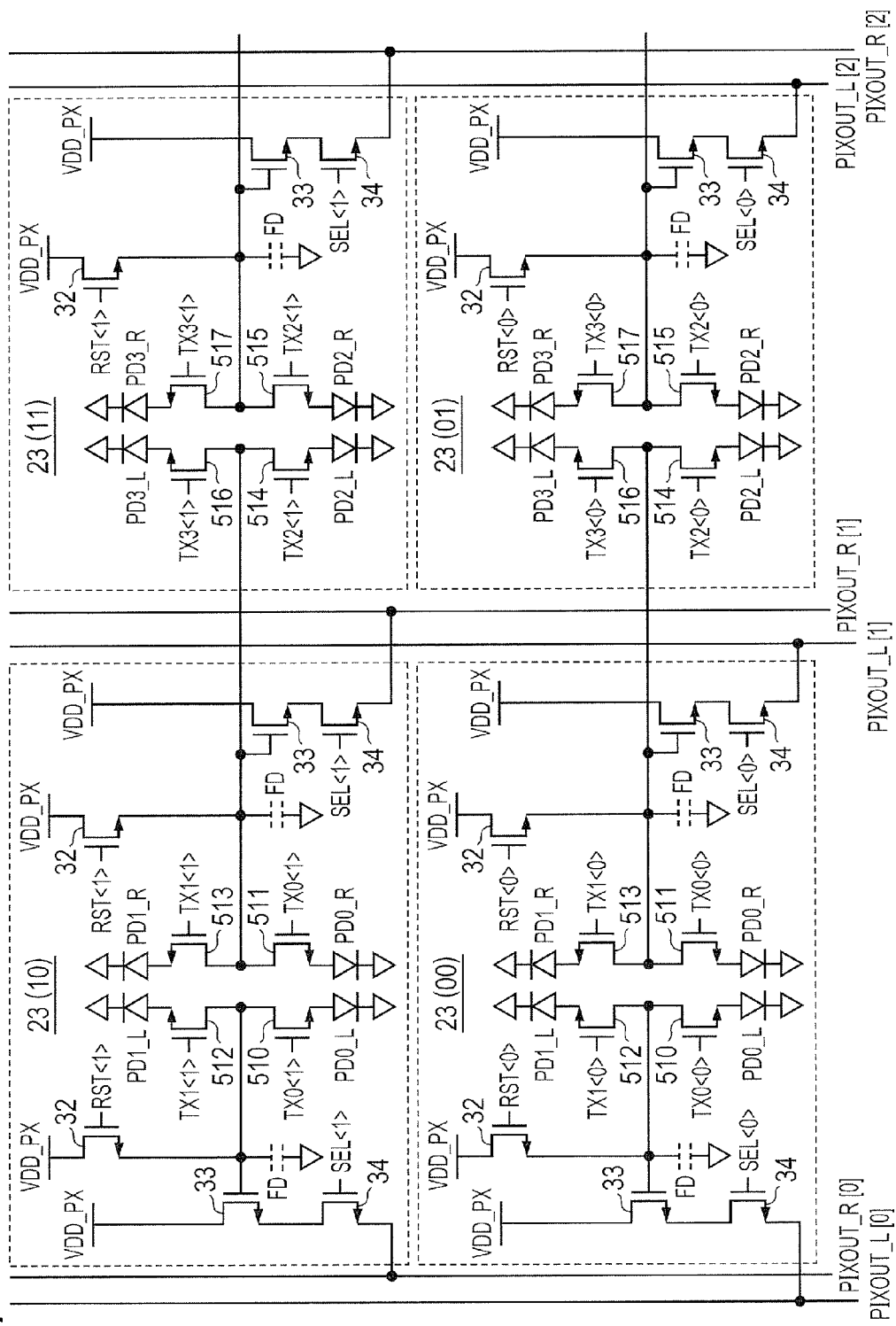
FIG. 17 is a circuit diagram of a pixel unit within the image sensing device according to the fourth embodiment.

Next, a description will be given of the circuit of the pixel unit 23c according to the fourth embodiment. Thus, FIG. 17 shows a circuit diagram of the pixel unit 23c within the sensor 15c according to the fourth embodiment. The example shown in FIG. 17 shows four pixel units 23c of two rows and two columns. Further, as shown in FIG. 17, in the sensor 15c according to the fourth embodiment, photodiodes PD0 and PI1 are provided in the pixel unit 23c placed in an even-numbered column, and photodiodes PD2 and PD3 are provided in the pixel unit 23 placed in an odd-numbered column. Then, each photodiode is configured with a left pixel that configures a left pixel photodiode PDx_L (x is a value that indicates the photodiode number) and a right pixel that configures a right pixel photodiode PDx_R.

Further, in the example shown in FIG. 17 the pixel signal from the left pixel of the photodiode of the pixel unit 23c is read by the amplifier transistor 33 that is provided corresponding to the right pixel of the pixel unit 23c placed in a column with a column number smaller by one. In other words, in the sensor 15c according to the fourth embodiment, a pair of vertical read lines is shared with the right pixel photodiode of the pixel unit placed in the nth column as well as the left pixel photodiode of the pixel unit placed in the n+1th column. Note that with respect to the pixel unit 23c placed in the 0th row, there is no column with a column number smaller by one, so that the amplifier transistor 33 is provided for the left pixel.

Further, in the example shown in FIG. 17, a transfer transistor 510 is provided corresponding to the photodiode PD0_L, a transfer transistor 511 is provided corresponding to the photodiode PD0_R, a transfer transistor 512 is provided corresponding to the photodiode PD1_L, a transfer transistor 513 is provided corresponding to the photodiode PD1_R, a transfer transistor 514 is provided corresponding to the photodiode PD2_L, a transfer transistor 515 is provided corresponding to the photodiode PD2_R, a transfer transistor 516 is provided corresponding to the photodiode PD3_L, and a transfer transistor 517 is provided corresponding to the photodiode PD3_R. Note that the configuration of the reset transistor 32, the amplifier transistor 33, and the selection transistor 34 is substantially the same as that of the pixel unit described with reference to FIG. 4 and other figures.

Figure 18:
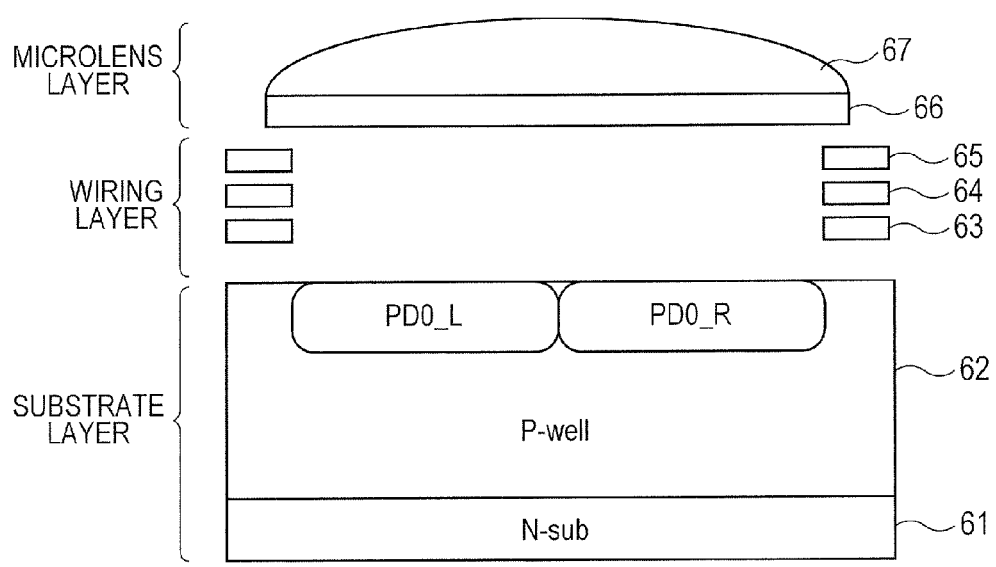
FIG. 18 is a cross-sectional view showing the structure of a photodiode of the image sensing device according to the fourth embodiment.

Here, a description will be given of the structure of the photodiode of the sensor 15c according to the fourth embodiment. Thus, FIG. 18 shows a cross-sectional view illustrating the structure of the photodiode of the sensor 15c according to the fourth embodiment. As shown in FIG. 18, in the pixel unit 23c, a P-well layer 62 is formed in the upper layer of an N-sub layer 61, in which the photodiodes PD0_L and PD0_R are formed over the surface of the P-well layer 62. Then, in the upper layer of the substrate layer formed of the N-sub layer 61 and the P-well layer 62, a wiring layer is formed in which lines 63 to 65 are formed. A microlens in the pixel unit 23c is formed in the upper layer of the wiring layer. In a microlens layer in which the microlens is formed, a microlens 67 is formed in the upper layer of a color filter 66. Then, as shown in FIG. 18, in the pixel unit 23c, the microlens 67 is formed to cover a pair of photodiodes.

Figure 19:
FIG. 19 is a timing chart showing an example of the operation of the image sensing device according to the fourth embodiment.

Next, a description will be given of the operation of the sensor 15c according to the fourth embodiment. Thus, FIG. 19 shows a timing chart illustrating an example of the operation of the sensor 15c according to the fourth embodiment. Note that only signals read to the vertical read line during the operation of the sensor 15c are shown in FIG. 19, in which the transition of the logic level of various control signals is omitted, it is assumed that the transition of the logic level of various control signals conforms to that described in the first embodiment.

As shown in FIG. 19, in the sensor 15c according to the fourth embodiment, when focusing on one vertical read line, the reset operation by the dark level output from the pixel unit coupled to each vertical read line ("read preparation" in the figure), and the transfer operation of the dark level and pixel signal output from the pixel unit to the analog/digital conversion circuit 24 ("read execution" in the figure) are repeatedly performed. On the other hand, when focusing on the operation between the vertical read lines belonging to the same column, the read execution process on the pixel unit 23c placed in either an even-numbered row or an odd-numbered row, and the read preparation for the pixel unit 23c placed in the other row, the even-numbered row or the odd-numbered row, are performed in parallel. Further, when focusing on the vertical read line that is shared with the pixel unit 23c of a column with a column number smaller by one, it can be seen that the period of use by the pixel unit 23c of the column with the column number smaller by one, and the period of use by the pixel unit 23c belonging to the own column are continuous.

As described above, the vertical lines are shared between adjacent columns, making it possible to avoid increasing the number of analog/digital conversion circuits 24 also when one photodiode within the pixel unit 23c is configured with right and left pixels.

Further, by using the pixel unit 23c in which one photodiode PD is configured with two photodiodes, it is possible to generate image feature information DCI for an autofocus process. Thus, the following describes a method for generating pixel information Do as well as a method for generating image feature information DCI in the sensor 15c according to the fourth embodiment.

Figure 20:
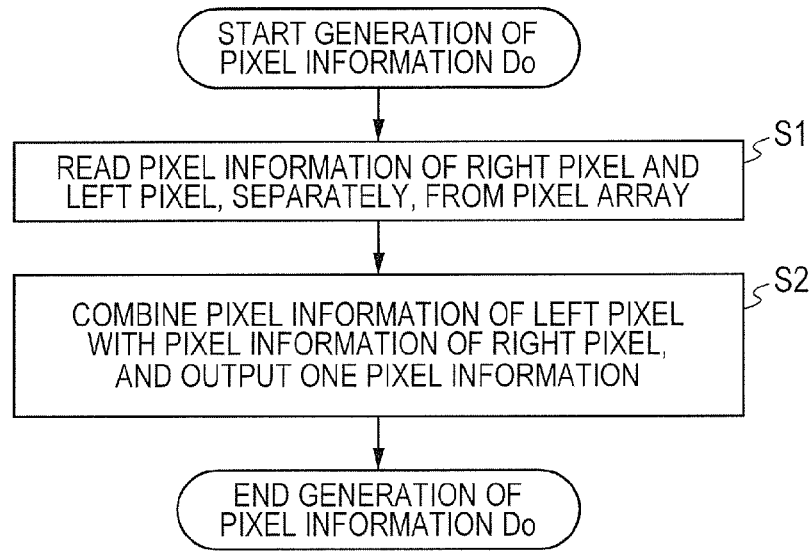
FIG. 20 is a flow chart showing the output process of image information in the image sensing device according to the fourth embodiment.

FIG. 20 shows a flow chart illustrating a process of outputting image information in the sensor 15c according to the fourth embodiment. As shown in FIG. 20, the sensor 15c according to the fourth embodiment reads pixel information of the right and left pixels from the pixel array 22c, separately (step S1). Then, the sensor 15c according to the fourth embodiment combines the pixel information of the right pixel and the pixel information of the left pixel to output one pixel information Do (step S2). In this way, the sensor 15c outputs one pixel information Do.

Figure 21:
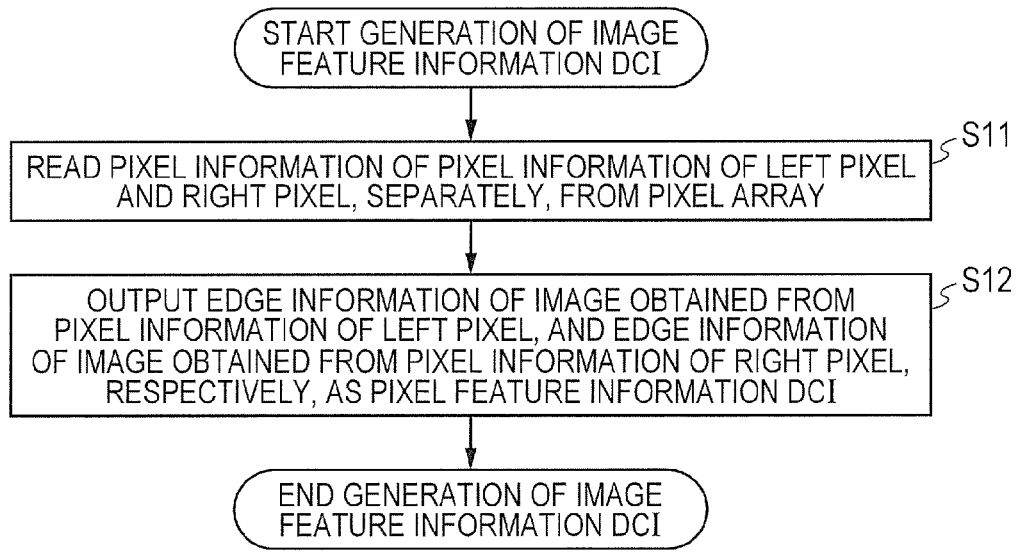
FIG. 21 is a flow chart showing the output process of image feature information in the image sensing device according to the fourth embodiment.

FIG. 21 shows a flow chart illustrating a process of outputting image feature information DCI in the sensor 15c according to the fourth embodiment. As shown in FIG. 21, the sensor 15c according to the fourth embodiment reads pixel information of the right and left pixels, separately (step S11). After that, the sensor 15c according to the fourth embodiment outputs the edge information of the image obtained from the pixel information of the right pixel, as well as the edge information of the image obtained from the pixel information of the left pixel, respectively, as image feature information DCI (step S12).

Here, the image feature information DCI will be described further in detail. First, FIG. 22 shows a diagram illustrating the principle of the phase difference autofocus in the sensor 15c according to the fourth embodiment. FIG. 22 shows the positional relationship between the evaluation surface (for example, the image surface) formed in the sensor surface, and the focusing surface on which the image of the incident light from the focus lens focuses.

As shown in FIG. 22, in the case of focus matching, the focusing surface, on which the image of the incident light from the focus lens focuses, matches the image surface (upper part of FIG. 22). On the other hand, in the case of focus deviation, the focusing surface on which the image of the incident light from the focus lens is formed at a position different from the image surface (lower part of FIG. 22). This deviation between the focusing surface and the image surface represents the amount of defocus.

Figure 23:
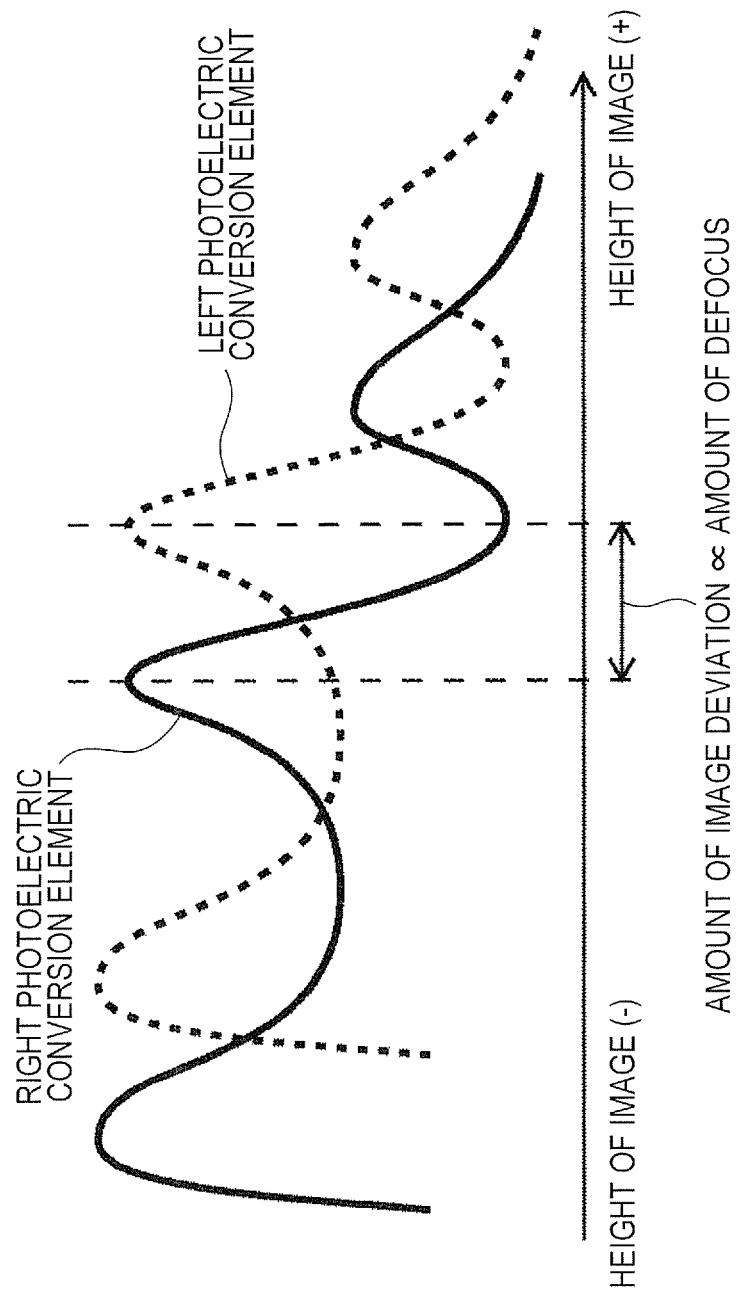
FIG. 23 is a graph showing the output of the photodiode when a focus deviation occurs in the image sensing device according to the fourth embodiment.

Here, a description will be given of an image formed in the image surface when focus deviation occurs. Thus, FIG. 23 shows a graph illustrating the output of the photodiode when focus deviation occurs. In FIG. 23, the horizontal axis represents the image height indicating the distance from the lens center axis of the pixel unit 23c, and the vertical axis represents the magnitude of the output of the pixel unit 23c.

As shown in FIG. 23, when the image is out of focus, the signal output from the left pixel and the signal output from the right pixel deviate in the image height direction. The amount of image deviation is proportional to the amount of defocus. Thus, in the camera system using the sensor 15c according to the fourth embodiment, the position of the focus lens 14 is determined by calculating the amount of defocus based on the amount of image deviation.

In the autofocus process of the camera system 1 using the sensor 5c according to the fourth embodiment, the position of the focus lens 14 is controlled so that the output signals from all pixel units arranged in the pixel array 22c of the sensor 15c match between the left and right pixels. Further, in the camera system 1 using the sensor 15c according to the fourth embodiment, the system control MCU19 controls the position of the focus lens 14 based on the image feature information DCI output from the sensor 15c.

As described above, by using the sensor 15c according to the fourth embodiment, it is possible to generate the image feature information DCI used in the autofocus process. Then, the camera system 1 using the sensor 15c according to the fourth embodiment can perform the autofocus process based on the image feature information DCI. Further, in the sensor 15c according to the fourth embodiment, it is possible to avoid increasing the circuit size and achieve high speed reading of pixel signals similarly to the first embodiment, while adding the function for generating the image feature information DCI.

Fifth Embodiment

In the fifth embodiment, a description will be given of a pixel unit 23d, which is still another form of the pixel unit 23, as well as a pixel array 22d including the pixel unit 23d. The pixel array 22d has a function for switching whether the floating diffusion of another pixel unit 23d placed in the same column is used as a common floating diffusion or as an independent floating diffusion for each pixel unit. Further, in the fifth embodiment, the sensor 15 including the pixel unit 23d is referred to as a sensor 15d. Thus, FIG. 24 shows a block diagram of the sensor 15d according to the fifth embodiment.

Figure 24:
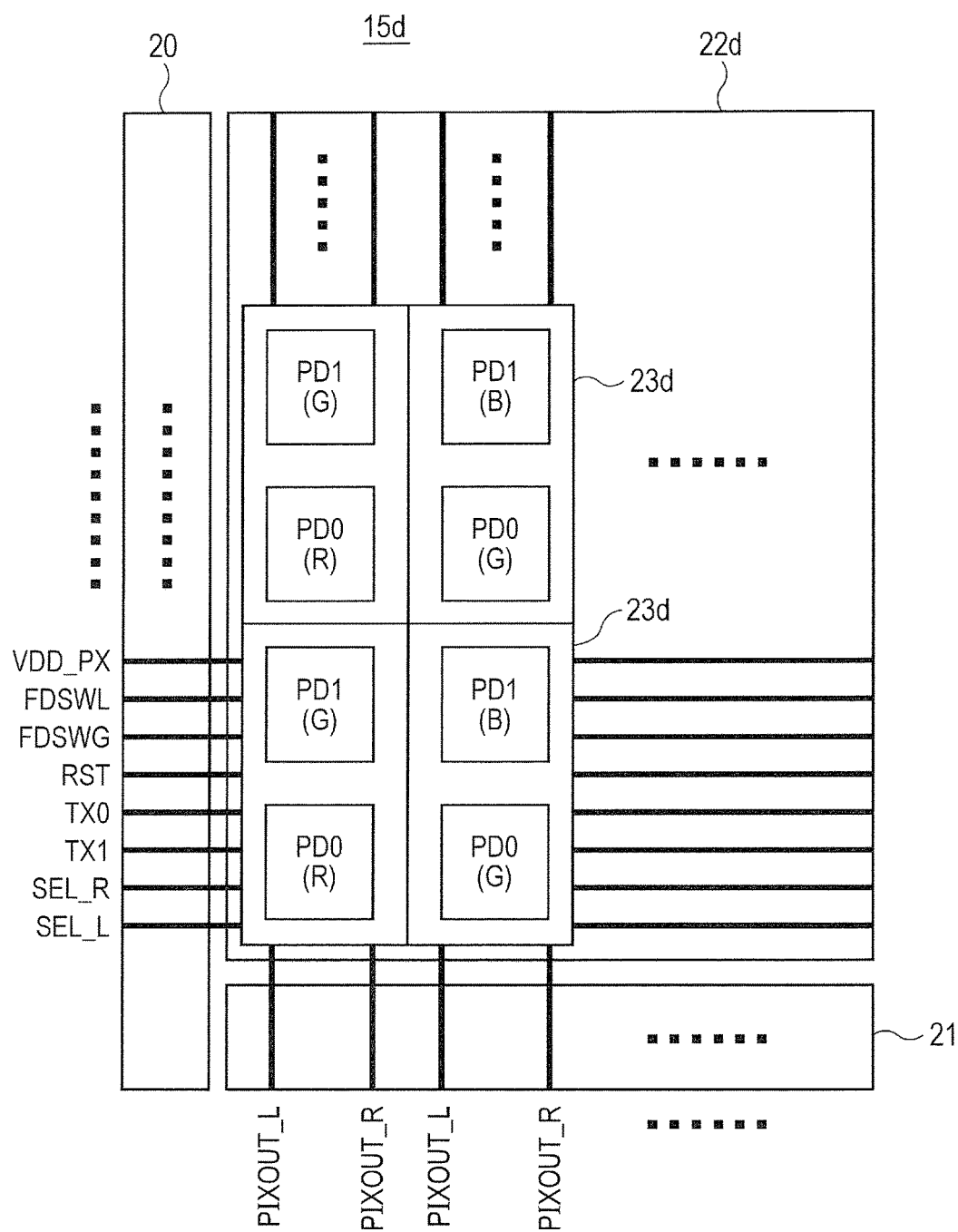
FIG. 24 is a block diagram of an image sensing device according to a fifth embodiment.

As shown in FIG. 24, the sensor 15d according to the fifth embodiment includes the pixel array 22d in which pixel units 23d are arranged in a lattice pattern. In the pixel unit 23d according to the fifth embodiment, the number of photodiodes per pixel unit is two. Thus, in the pixel array 22d according to the fifth embodiment, color filters are arranged in the Bayer pattern by using adjacent pixel units of two columns. In addition, also in the sensor 15d according to the fifth embodiment, two vertical read lines are provided corresponding to the pixel units of one column.

Further, as shown in FIG. 24, a local FD control signal FDSWL and a global FD control signal FDSWG are given to each of the pixel units 23d, in addition to the two transfer control signals TX (TX0, TX1 in FIG. 24), reset control signal RST, two selection signals SEL (SEL_L, SEL_R in FIG. 24), and power supply line VDD_PX.

Figure 25:
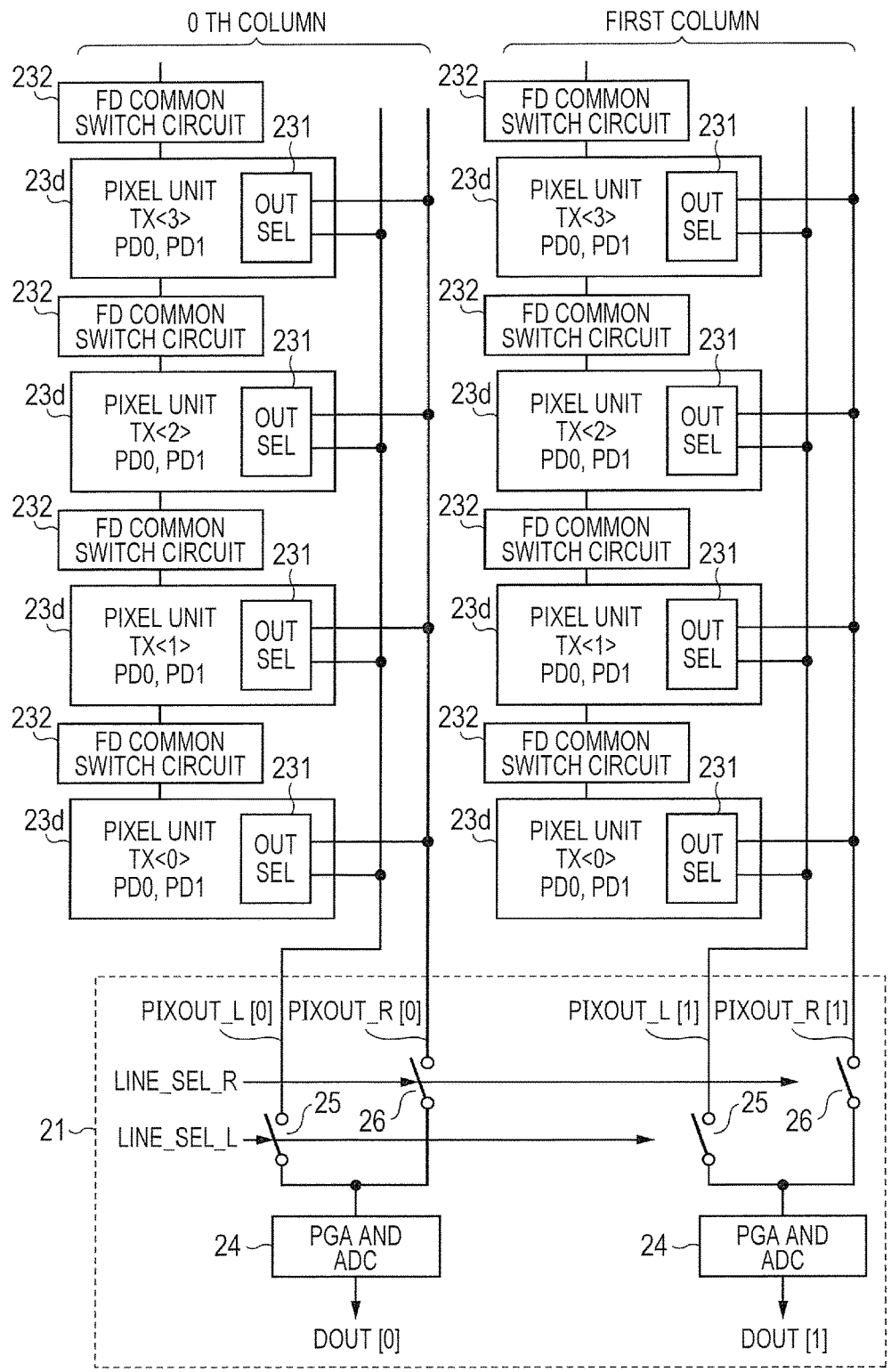
FIG. 25 is a block diagram showing a circuit configuration of a pixel array of the image sensing device according to the fifth embodiment.

Next, a description will be given of the detailed circuit configuration of the pixel array 22d according to the fifth embodiment. Thus, FIG. 23 shows a block diagram illustrating the circuit configuration of the pixel array 22d according to the fifth embodiment. As shown in FIG. 25, in the sensor 15d according to the fifth embodiment, the configuration of the column controller 21, for example, is the same as the configuration of the first embodiment. On the other hand, the pixel array 22d is different from other embodiments in the configuration within the pixel unit to be provided, and in that a floating diffusion common switch circuit 232 is added to switch whether the floating diffusion within the pixel unit is shared or switched.

Each pixel unit 23d includes an output line switching circuit 231. The output line switching circuit 231 is provided in place of the selection transistor 34. The output line switching circuit 231 switches whether the output signal of a first amplifier transistor (for example, amplifier transistor 33 within the own pixel unit) is output to a first vertical read line (for example, vertical read line PIXOUT_L) or to a second vertical read line (for example, vertical read line PIXOUT_R).

The floating diffusion common switch circuit 232 switches whether the floating diffusions within the pixel units to be shared are commonly used between the pixel units to be shared, or are used as separate floating diffusions.

More specifically, when it is assumed that, of the pixel units to be shared, the floating diffusion included in one pixel unit is the first floating diffusion and the floating diffusion included in the other pixel is a second floating diffusion, the switching operation can be done as follows. The floating diffusion common switch circuit 232 switches whether the first floating diffusion and the second floating diffusion are made shared or independent.

Next, a description will be given of a specific circuit of the pixel unit 23*d* and the floating diffusion common switch circuit 232 according to the fifth embodiment. Thus, FIG. 26 shows a circuit diagram of the pixel unit 23*d* and the floating diffusion common switch circuit 231 within the image sensing device according to the fifth embodiment.

Figure 26:
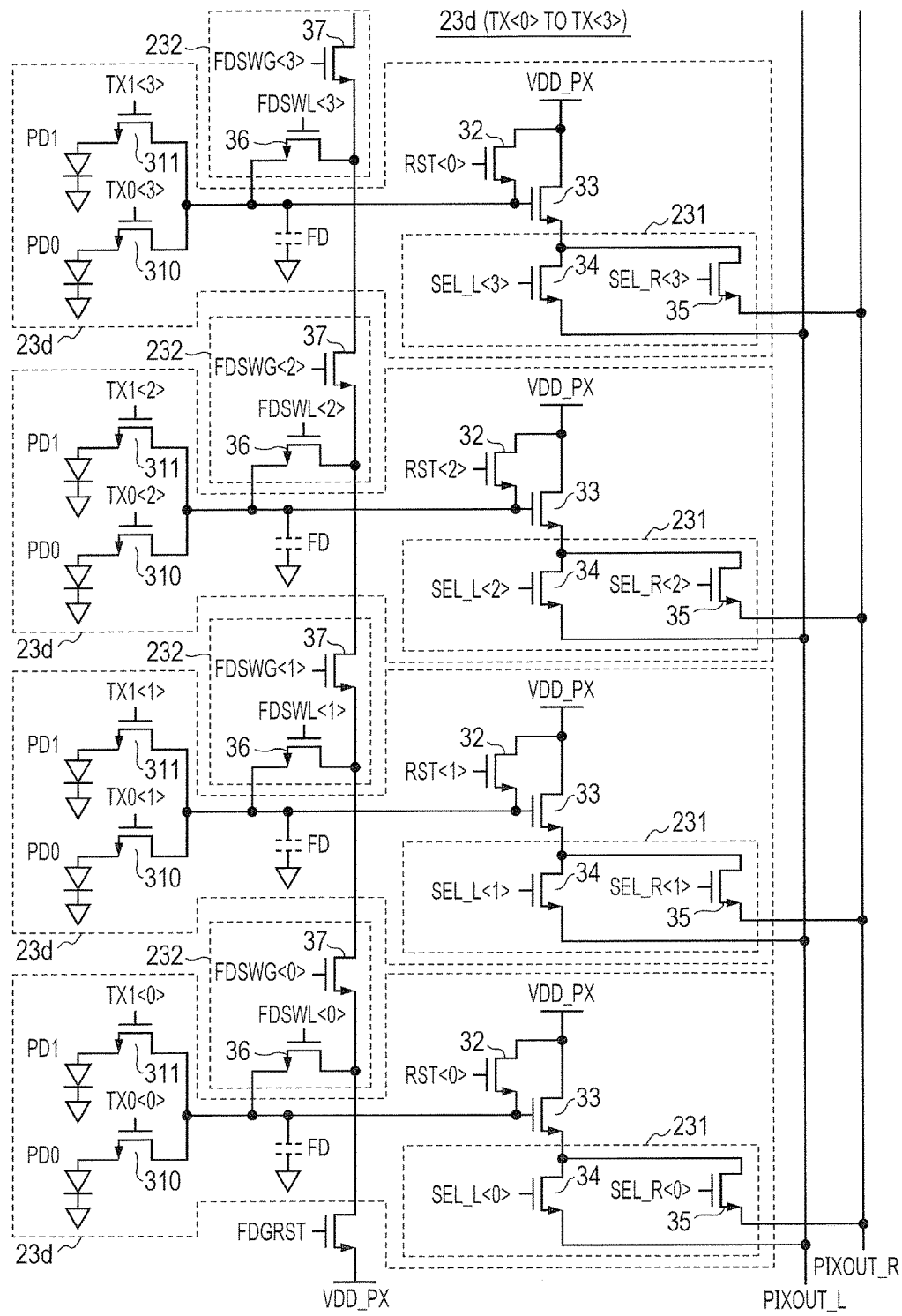
FIG. 26 is a circuit diagram of pixel units and floating diffusion common switching circuits within the image sensing device according to the fifth embodiment.

As shown in FIG. 26, the pixel unit 23*d* is configured such that the selection transistor 34 of the pixel unit 23*a* described in the second embodiment is replaced by the output line switching circuit 231. Further, the output line switching circuit 231 includes the selection transistor 34 and the selection transistor 35. The analog/digital conversion circuit 24 is provided between the source of the amplifier transistor 33 and the vertical read line PIXOUT_L. The conductive state of the selection transistor 34 is controlled by the selection signal SEL_L. The selection transistor 35 is provided between the source of the amplifier transistor 33 and the vertical read line PIXOUT_R. The conductive state of the selection transistor 35 is controlled by the selection signal SEL_R.

The floating diffusion common switch circuit 232 includes a local switch transistor 36 and a global switch transistor 37. The local switch transistor 36 couples the floating diffusion of the corresponding pixel unit 23*d* and the source of the global switch transistor 37. In the global switch transistor 37, the drain is coupled to the source of the global switch transistor 37 of the floating diffusion common switch circuit 232 that is provided corresponding to the pixel unit 23*d* of the next upper row. Note that, of the floating diffusion common switch circuits 232, the source of the global switch transistor 37 of the floating diffusion common switch circuit 232 provided corresponding to the pixel unit 23*d* of the 0th row, is coupled to the drain of a global line reset transistor. This global line reset transistor is provided between the power supply line VDD_PX and the source of the global switch transistor 37 of the floating diffusion common switch circuit 232 provided corresponding to the pixel unit of the 0th row. Further, the conductive state of the global line reset transistor is controlled by the global FD reset control signal FDGRST.

The image sensing device 15*d* according to the fifth embodiment has a first operation mode for performing a normal pixel reading process, as well as a second operation mode for performing pixel reading process after the combining process within the pixel. Thus, a description will be given of a unit of pixel unit to be read for each operation mode.

Figure 27:
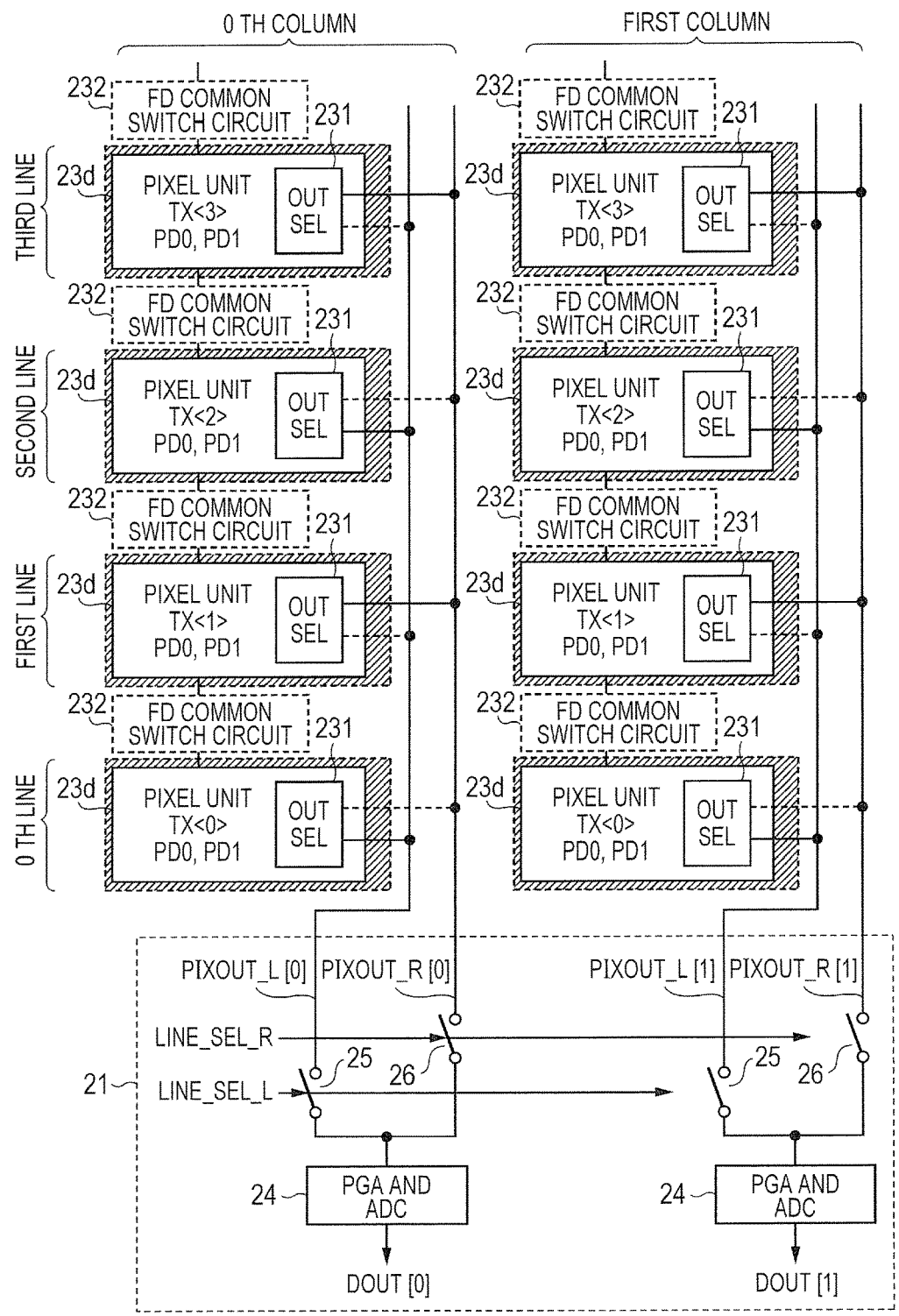
FIG. 27 is a block diagram showing a configuration of the pixel units of the image sensing device in a first operation mode of the image sensing device according to the fifth embodiment.

First, FIG. 27 shows a block diagram illustrating the configuration of the pixel unit in the first operation mode in the image sensing device according to the fifth embodiment. As shown in FIG. 27, in the first operation mode in which one pixel unit is used as one unit of reading, the floating diffusion common switch circuit 232 is made invalid, so that the floating diffusion of each pixel unit is used independently. Further, the output line switching circuit 231 within the pixel unit 23*d* placed in an even-numbered row outputs the signal that is output from the pixel unit, to the vertical read line PIXOUT_L. The output line switching circuit 231 within the pixel unit 23*d* placed in an odd-numbered row outputs the signal that is output from the pixel unit, to the vertical read line PIXOUT_R.

Figure 28:
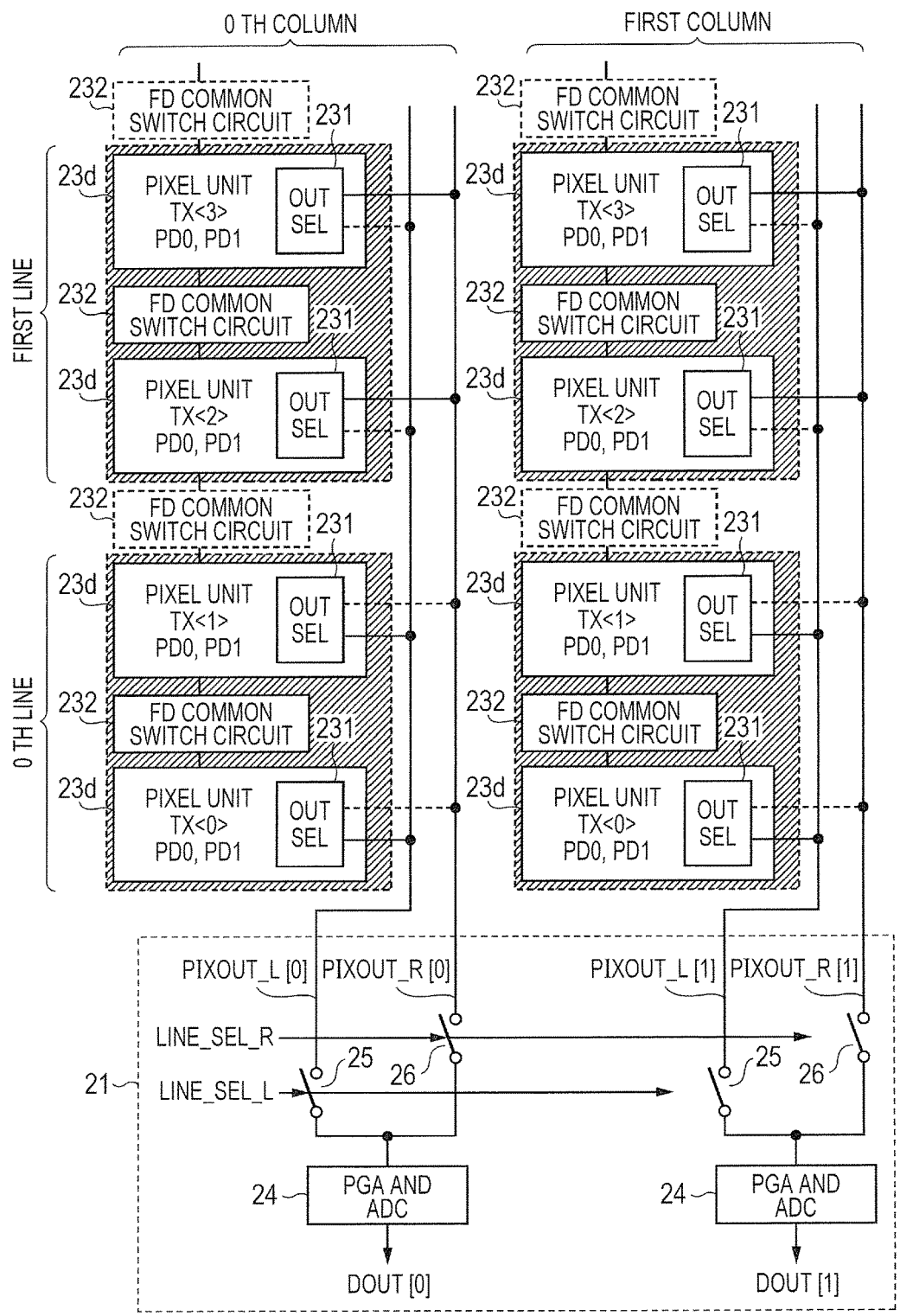
FIG. 28 is a block diagram showing a configuration of the pixel units of the image sensing device in a second operation mode according to the fifth embodiment.

Next, FIG. 28 shows a block diagram illustrating the configuration of the pixel unit in the second mode in the image sensing device according to the fifth embodiment. As shown in FIG. 28, in the second operation mode, the pixel units which are placed in the odd-numbered row and in the even-numbered row, respectively, in the first operation mode are used as one pixel unit. Further, in the second operation mode in which two pixel units are combined as one pixel unit, the floating diffusion common switch circuit 232 provided between the two pixel units is made valid. In this way, the floating diffusions within the pixel units combined as one pixel unit are shared between the pixel units. Then, in the second operation mode, for example, the pixel units that are physically placed in the 0th row and the first row are combined to form a combined pixel unit of the 0th row, and pixel units that are physically placed in the second row and the third row are combined to form a combined pixel unit of the first row. Further, the output line switching circuit 231 of the combined pixel unit, which is placed in the row whose row number after combination is an even number, outputs the output of the amplifier transistor 33 to the vertical read line PIXOUT_L. The output line switching circuit 231 of the combined pixel unit, which is placed in the row whose row number after combination is an odd number, outputs the output of the amplifier transistor 33 to the vertical read line PIXOUT_R.

In other words, in the image sensing device 15*d* according to the fifth embodiment, in the second operation mode, each of the first combined pixel unit and the second combined pixel unit includes at least two pixel units to be combined (for example, two pixel units 23*d* included in the pixel unit belonging to each row in FIG. 23), and a floating diffusion common switch circuit 232 for switching whether the pixel units to be combined are made common or independent with respect to the floating diffusions within the pixel units to be combined. On the other hand, in the first operation mode, the image sensing device 15*d* according to the fifth embodiment controls the pixel units to be combined as independent pixel units.

Further, in the image sensing device 15*d* according to the fifth embodiment, each of the pixel units to be combined includes light receiving elements (for example, photodiodes PD0, PD1), transfer transistors (for example, transfer transistors 310, 311) provided corresponding to each of the light receiving elements, and the output line switching circuit 231 for switching whether the output signal of the amplifier transistor 33 is output to a first vertical read line (for example, vertical read line PIXOUT_L) or a second vertical read line (for example, vertical read line PIXOUT_R).

Then, in the image sensing device 15*d* according to the fifth embodiment, in the first operation mode for instructing the floating diffusion common switch circuit 232 to make the floating diffusions being independent within the pixel units to be combined, the timing control circuit (for example, the row controller 20) instructs the output line switching circuit 231 within the pixel unit to be combined in an even-numbered row, to allow the vertical read line PIXOUT_L to function as a line that outputs the output signal of the amplifier transistor, and also instructs the output line switching circuit 231 within the pixel unit to be combined in an odd-numbered row, to allow the vertical read line PIXOUT_R to function as a line that outputs the output signal of the amplifier transistor. Further, in the second operation mode for instructing the floating diffusion common switch circuit 232 to make the floating diffusions being common within the pixel units to be combined, the timing control circuit (for example, the row controller 20) instructs the output line switching circuit 231 of the pixel units to be combined, which belong to a first combined pixel unit placed in an even-numbered row after combination, to allow the vertical read line PIXOUT_L to function as a line that outputs the output signal of the amplifier transistor, and also instructs the output line switching circuit 231 of the pixel units to be combined, which belong to a second combined pixel unit placed in an odd-numbered row after combination, to allow the vertical read line PIXOUT_R to function as a line that outputs the output signal of the amplifier transistor.

Figure 29:
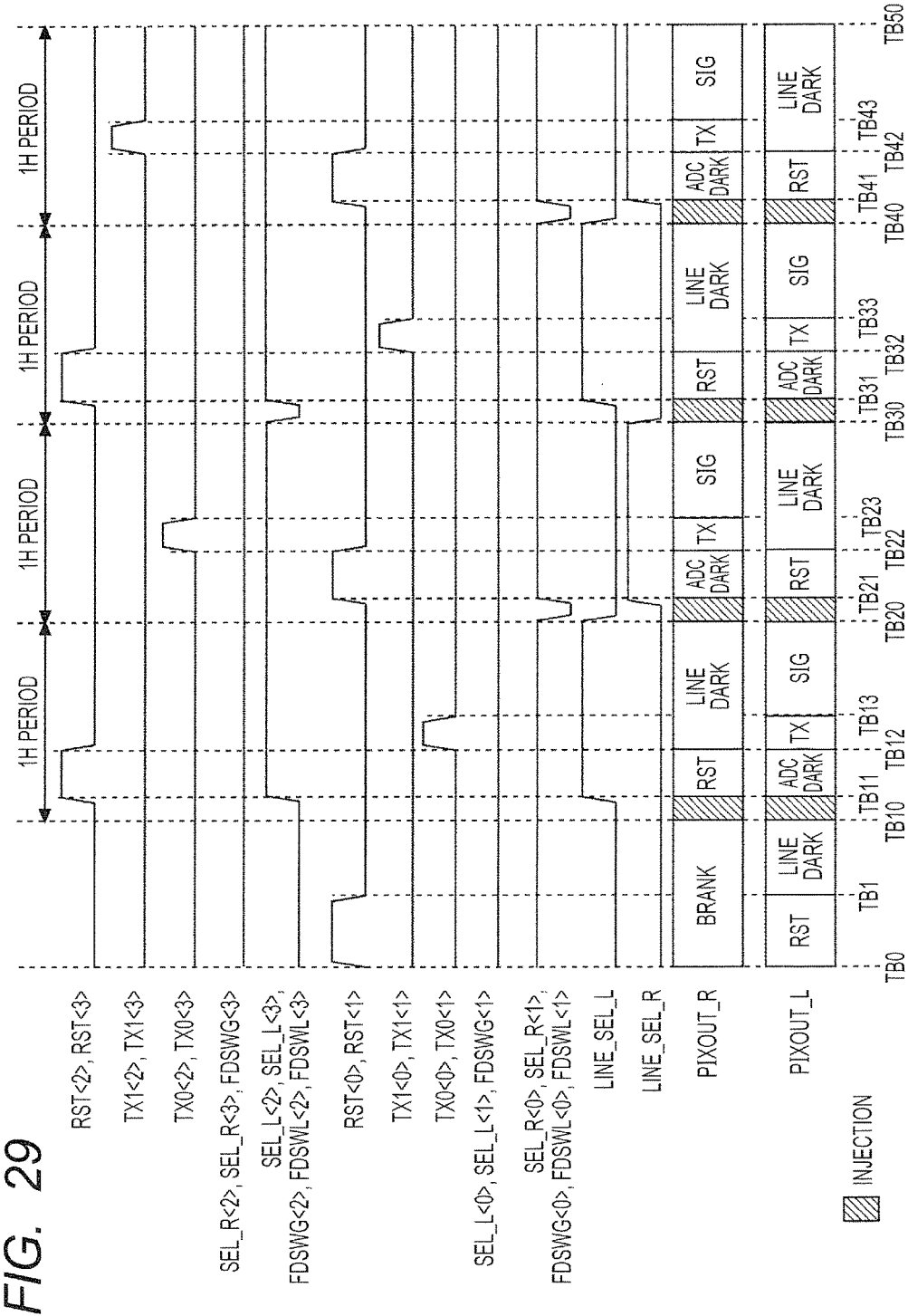
FIG. 29 is a timing chart showing an example of the operation of the image sensing device in the second operation mode according to the fifth embodiment.

Next, a description will be given of the operation of the image sensing device 15*d* according to the fifth embodiment with reference to a timing chart. Note that the operation in the first operation mode of the sensor 15*d* according to the fifth embodiment is the same as the operation of the image sensing device 15*a* according to the second embodiment when the local FD control signal FDSWL and the global FD control signal FDSWG are both set to the low level. Thus, the description of the first operation mode is omitted here. FIG. 29 shows a timing chart illustrating an example of the operation in the second operation mode of the image sensing device according to the fifth embodiment.

As shown in FIG. 29, in the second operation mode, the image sensing device 15*d* according to the fifth embodiment switches the local FD control signals FDSWL<0> and FDSWL<1>, the global FD control signal FDSWG<0>, and the selection signals SEL_L<0> and SEL_L<1>, between high level and low level in conjunction with the output timing from the combined pixel unit. At the same time, the image sensing device 15*d* maintains the global FD control signal FDSWG<1> as well as the selection signals SEL_R<0> and SEL_R<1> at the low level. Further, the image sensing device 15*d* switches the local FD control signals FDSWL<2> and FDSWL<3>, the global FD control signal FDSWG<2>, and the selection signals SEL_R<2> and SEL_R<3>, between high level and low level in conjunction with the output timing from the combined pixel unit. At the same time, the image sensing device 15*d* maintains the global FD control signal FDSWG<3> as well as the selection signals SEL_L<2> and SEL_L<3> at the low level. This control allows the image sensing device 15*d* according to the fifth embodiment to have the circuit configuration shown in FIG. 28, and to perform the same read operation as the image sensing device 15*a* according to the second embodiment. Further, in the image sensing device according to the fifth embodiment, the signal output to the vertical read lines PIXOUT_L and PIXOUT_R is the signal obtained by combining signals generated by two photodiodes within two pixel units to be combined.

As described above, the image sensing device 15*d* according to the fifth embodiment configures one combined pixel unit with two pixel units to be combined, and makes the floating diffusions being common within the two pixel units to be combined. Then, the image sensing device 15*d* according to the fifth embodiment combines the signals generated by two photodiodes within two pixel units to be combined into one signal within the combined pixel unit, and outputs the signal to the vertical read line. In this way, the image sensing device 15*d* according to the fifth embodiment can increase the S/N ratio of the signal generated within the pixel array 22*d*.

Figure 30:
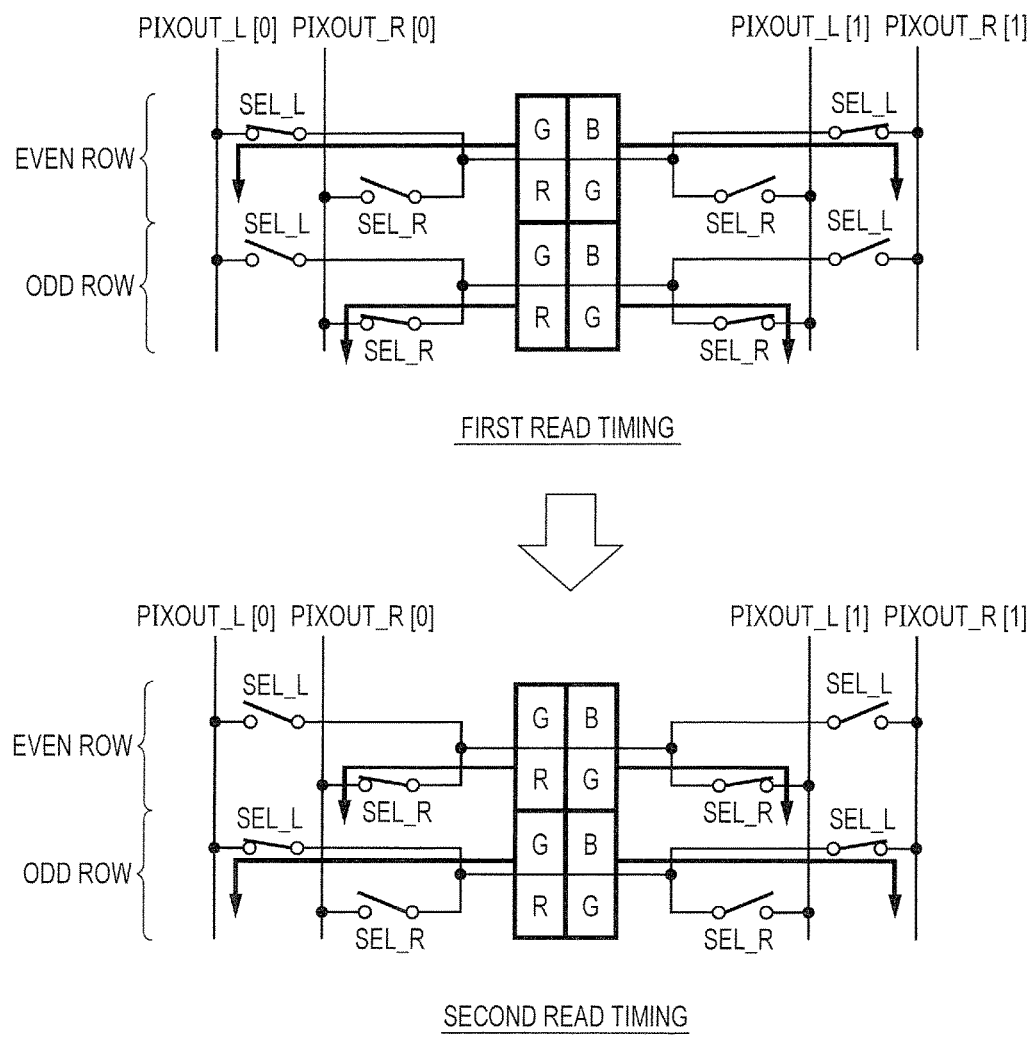
FIG. 30 is diagram showing a variation of the read operation of the image sensing device in the first operation mode according to the fifth embodiment.

Further, the image sensing device 15*d* according to the fifth embodiment has the output line switching circuit 231 within the pixel unit, and can fix the color of the color filter corresponding to the transmitted signal for each vertical read line. Thus, a description will be given of the correspondence between the color of the color filter and the vertical read line that transmits the signal. FIG. 30 shows a diagram illustrating a variation of the read operation in the first operation mode of the image sensing device according to the fifth embodiment. In the example shown in FIG. 30, the operation in the first operation mode is described. However, the same operation is possible also in the second operation.

As shown in FIG. 30, the image sensing device 15*d* according to the fifth embodiment switches the selection transistor used for outputting the signal, between the first read timing and the second read timing, even when the signal is output from the same pixel unit. In this way, it is possible to configure the image sensing device that outputs the output signal corresponding, for example, to the red color filter through the vertical read line PIXOUT_R.

While the invention made by the present inventors has been described specifically based on its embodiments hereinbefore, it will be obvious that the present invention is not limited to the described embodiments and various modifications may be made with out departing from the scope of the invention.

What is claimed is:

1. An image sensing device comprising:
    a pixel array including a plurality of pixel units arranged in an array form;
    a first pixel unit and a second pixel unit that is placed in the column of the first pixel unit, both of which are included in the pixel array;
    a first floating diffusion provided in the first pixel unit;
    a second floating diffusion provided in the second pixel unit;
    a first vertical read line coupled to the first pixel unit;
    a second vertical read line coupled to the second pixel unit;
    a first transfer switch provided at an end of the first read line;
    a second transfer switch provided at an end of the second read line;
    an analog/digital conversion circuit that outputs a digital value corresponding to the signal level of the signal input through the first transfer switch, or a digital value corresponding to the signal level of the signal input through the second transfer switch; and
    a timing control circuit that controls the operation timing of the first and second pixel units, the first and second transfer switches, and the analog/digital conversion circuit,
    wherein when the first transfer switch is brought into an OFF state, the timing control circuit resets the signal level of the first floating diffusion and the signal level of the first vertical read line, to dark level, and
    wherein when the second transfer switch is brought into an ON state, the timing control circuit transfers the pixel signal of the second pixel unit to the analog/digital conversion circuit through the second floating diffusion and the second vertical read line.

2. The image sensing device according to claim 1,
    wherein when the second transfer switch is brought into the conductive state, the timing control circuit transfers the dark level of the second floating diffusion, as well as the dark level of the second vertical read line to the analog/digital conversion circuit, before transferring the pixel signal of the second pixel unit to the analog/digital conversion circuit.

3. The image sensing device according to claim 1, comprising first and second combined pixel units that replace the first pixel unit and the second pixel unit,
wherein each of the first combined pixel unit and the second combined pixel unit comprises:
at least two pixel units to be combined; and
a floating diffusion common switch circuit for switching whether the floating diffusions are made common or independent within a plurality of pixel units to be combined,
wherein each of the pixel units to be combined comprises:
a light receiving element;
a transfer transistor provided corresponding to the light receiving element;
a floating diffusion and an amplifier transistor that are provided corresponding to the transfer transistor; and
an output line switching circuit for switching whether the output signal of the amplifier transistor is output to the first vertical read line or to the second vertical read line,
wherein, in a first operation mode for instructing the floating diffusion common switch circuit to make the floating diffusions being independent within the pixel units to be combined, the timing control circuit instructs the output line switching circuit within the pixel units to be combined in an even-numbered row, to allow the first vertical read line to function as a line that outputs the output signal of the amplifier transistor,
wherein, in the first operation mode, the timing control circuit instructs the output line switching circuit within the pixel units to be combined in an odd-numbered row, to allow the second vertical read line to function as a line that outputs the output signal of the amplifier transistor,
wherein, in a second operation mode for instructing the floating diffusion common switch circuit to make the floating diffusions being common within the pixel units to be combined, the timing control circuit instructs the output line switching circuit of the pixel units to be combined belonging to the first combined pixel unit, to allow the first vertical read line to function as a line that outputs the output signal of the amplifier transistor, and
wherein, in the second operation mode, the timing control circuit instructs the output line switching circuit of the pixel units to be combined belonging to the second combined pixel unit, to allow the second vertical read line to function as a line that outputs the output signal of the amplifier transistor.

4. An image sensing device comprising:
a first pixel unit coupled to a first vertical read line;
a second pixel unit that is coupled to a second vertical read line and is placed in the column of the first pixel unit;
a first transfer switch provided at an end of the first read line;
a second transfer switch provided at an end of the second read line;
an analog/digital conversion circuit that outputs a digital value according to the signal level of signals input through the first and second transfer switches; and
a timing control circuit that controls the operation timing of the first and second pixel units, the first and second transfer switches, and the analog/digital conversion circuit,
wherein the timing control circuit controls the first and second pixel units, the first and second transfer switches, and the analog/digital conversion circuit so that a reset process and a conversion output process are performed in parallel in one period,
wherein, the resent process is capable of resetting the signal level of the vertical read line to be reset that is coupled to one transfer switch controlled to be OFF, either the first transfer switch or the second transfer switch, as well as the signal level of the floating diffusion within the pixel unit coupled to the vertical read line to be reset, to dark level, and
wherein the conversion output process is capable of converting a dark level signal with dark level output from the vertical read line to be read that is coupled to the other transfer switch controlled to be ON, either the first transfer switch or the second transfer switch, outputting a pixel signal to the analog/digital conversion circuit from the pixel unit coupled to the vertical read line to be read, and converting the pixel signal to a digital value.

5. The image sensing device according to claim 4, wherein, in a period other than the period in which the analog/digital conversion circuit performs the analog/digital conversion process for converting the signal with analog value into a digital value, the timing control circuit switches the logic level of a reset control signal for instructing the pixel unit to perform the reset operation.

6. The image sensing device according to claim 4,
wherein each of the first and second pixel units comprises:
a plurality of light receiving elements;
a plurality of transfer transistors provided corresponding to each of the light receiving elements; and
a floating diffusion and an amplifier transistor that are commonly provided to the transfer transistors,
wherein the timing control circuit controls the transfer transistors within the first pixel unit and the second pixel unit so as to output the pixel signals from the first pixel unit and the second pixel unit, alternately.

7. The image sensing device according to claim 4,
wherein each of the first and second pixel units comprises a right photoelectric conversion element and a left photoelectric conversion element, which are placed next to each other in a lower part of a microlens, as one light receiving element,
wherein each of the first and second vertical read lines is shared by the right photoelectric conversion element of the pixel unit placed in the nth row and by the left photoelectric conversion element of the pixel unit placed in the n+1th row.

8. The image sensing device according to claim 4,
wherein each of the first vertical read line and the second vertical read line is provided with a pixel power supply to draw current from the corresponding read line.

9. The image sensing device according to claim 4,
wherein the analog/digital conversion circuit comprises an input terminal that is commonly provided to the first transfer switch and the second transfer switch,
wherein the analog/digital conversion circuit performs the conversion of the dark level signal input through the first transfer switch into a digital signal as well as the conversion of the pixel signal into a digital value, and the conversion of the dark level signal input through the second transfer switch into a digital signal as well as the conversion of the pixel signal into a digital value, alternately.

10. The image sensing device according to claim 4, comprising first and second combined pixel units that replace the first pixel unit and the second pixel unit, wherein each of the first combined pixel unit and the second combined pixel unit comprises:

at least two pixel units to be combined;

a floating diffusion common switch circuit for switching whether the floating diffusions are made common or independent within a plurality of pixel units to be combined, wherein each of the pixel units to be combined comprises:

a light receiving element;

a transfer transistor provided corresponding to the light receiving element;

a floating diffusion and an amplifier transistors that are provided corresponding to the transfer transistor; and an output line switching circuit for switching whether the output signal of the amplifier transistor is output to the first vertical read line or to the second vertical read line, wherein, in a first operation mode for instructing the floating diffusion common switch circuit to make the floating diffusions being independent within the pixel units to be combined, the timing control circuit instructs the output line switching circuit within the pixel units to be combined in an even-numbered row, to allow the first vertical read line to function as a line that outputs the output signal of the amplifier transistor, wherein, in the first operation mode, the timing control circuit instructs the output line switching circuit within the pixel units to be combined in an odd-numbered row, to allow the second vertical read line to function as a line that outputs the output signal of the amplifier transistor, wherein, in a second operation mode for instructing the floating diffusion common switch circuit to make the floating diffusions being common within the pixel units to be combined, the timing control circuit instructs the output line switching circuit of the pixel units to be combined belonging to the first combined pixel unit, to allow the first vertical read line to function as a line that outputs the output signal of the amplifier transistor, and wherein, in the second operation mode, the timing control circuit instructs the output line switching circuit of the pixel units to be combined belonging to the second combined pixel unit, to allow the second vertical read line to function as a line that outputs the output signal of the amplifier transistor.

11. The image sensing device according to claim 10, wherein the light receiving element includes a plurality of light receiving elements.

\* \* \* \* \*